(12) United States Patent
Salerno et al.

(10) Patent No.: US 7,030,596 B1
(45) Date of Patent: Apr. 18, 2006

(54) METHODS AND CIRCUITS FOR PROGRAMMABLE AUTOMATIC BURST MODE CONTROL USING AVERAGE OUTPUT CURRENT

(75) Inventors: David C. Salerno, New Boston, NH (US); Mark G. Jordan, New Boston, NH (US)

(73) Assignee: Linear Technology Corporation, Milpitas, CA (US)

( * ) Notice: Subject to any disclaimer, the term of this patent is extended or adjusted under 35 U.S.C. 154(b) by 287 days.

(21) Appl. No.: 10/728,021

(22) Filed: Dec. 3, 2003

(51) Int. Cl.
*G05F 1/40* (2006.01)

(52) U.S. Cl. .................................................. 323/282
(58) Field of Classification Search ................ 323/282, 323/283, 284, 285, 351
See application file for complete search history.

(56) References Cited

U.S. PATENT DOCUMENTS

| | | | |
|---|---|---|---|
| 3,458,798 A | 7/1969 | Fang et al. |
| 3,571,697 A | 3/1971 | Phillips |
| 3,579,091 A | 5/1971 | Clarke et al. |
| 3,581,186 A | 5/1971 | Weinberger |
| 3,582,758 A | 6/1971 | Gunn |
| 3,585,491 A | 6/1971 | Peterson |
| 3,733,540 A | 5/1973 | Hawkins |
| 3,772,588 A | 11/1973 | Kelly et al. |
| 3,784,893 A | 1/1974 | Rando |
| 3,863,128 A | 1/1975 | Wilwerding |
| 3,879,647 A | 4/1975 | Hamilton et al. |
| 3,992,638 A | 11/1976 | Sauvanet |
| 4,013,939 A | 3/1977 | Biess et al. |
| 4,035,710 A | 7/1977 | Joyce |
| 4,071,884 A | 1/1978 | Maigret |
| 4,160,288 A | 7/1979 | Stuart et al. |
| 4,326,245 A | 4/1982 | Saleh |
| 4,395,675 A | 7/1983 | Toumani |
| 4,428,015 A | 1/1984 | Nesler |
| 4,462,069 A | 7/1984 | Becky |
| 4,479,174 A | 10/1984 | Cates |
| 4,493,017 A | 1/1985 | Kammiller et al. |
| 4,519,024 A | 5/1985 | Federico et al. |

(Continued)

FOREIGN PATENT DOCUMENTS

EP        0 428 377 A2    5/1991

(Continued)

OTHER PUBLICATIONS

Cassani, John C. et al.; "Sophisticated Control IC Enhances 1MHz Current Controlled Regulator Performance"; Proceedings of HFPC, May 1992, pp. 167-173.

(Continued)

*Primary Examiner*—Adolf Berhane
(74) *Attorney, Agent, or Firm*—Fish & Neave IP Group Ropes & Gray LLP; Mark D. Rowland; Chi-Hsin Chang

(57) ABSTRACT

The present invention comprises a user-programmable control circuit for use in a power converter to automatically transition the converter into BURST mode when load current demand is low. The control circuit senses load current demand by monitoring the output current of the converter, and generating a signal representative of the monitored output current. The control circuit may automatically transition the converter into BURST mode when the signal indicative of the average monitored output current decreases below a user-programmable threshold. BURST mode may increase overall converter efficiency by turning OFF a plurality of electronic components, and maintaining the converter's output voltage at a regulated level by energy stored in an output capacitor.

36 Claims, 7 Drawing Sheets

U.S. PATENT DOCUMENTS

| | | | |
|---|---|---|---|
| 4,541,041 A | 9/1985 | Park et al. | |
| 4,554,499 A | 11/1985 | Sherman et al. | |
| 4,578,630 A | 3/1986 | Grosch | |
| 4,610,521 A | 9/1986 | Inoue | |
| 4,634,956 A | 1/1987 | Davis et al. | |
| 4,672,303 A | 6/1987 | Newton | |
| 4,672,518 A | 6/1987 | Murdock | |
| 4,674,020 A | 6/1987 | Hill | |
| 4,683,529 A | 7/1987 | Bucher, II | |
| 4,709,315 A | 11/1987 | Ramos | |
| 4,712,169 A | 12/1987 | Albach | |
| 4,716,514 A | 12/1987 | Patel | |
| 4,727,308 A | 2/1988 | Huljak et al. | |
| 4,754,385 A | 6/1988 | McDade et al. | |
| 4,801,859 A | 1/1989 | Dishner | |
| 4,813,066 A | 3/1989 | Holtz et al. | |
| 4,814,684 A | 3/1989 | McCurdy | |
| 4,819,122 A | 4/1989 | Gontowski, Jr. | |
| 4,823,070 A | 4/1989 | Nelson | |
| 4,843,532 A | 6/1989 | Freedman | |
| 4,866,587 A | 9/1989 | Wadlington | |
| 4,870,555 A | 9/1989 | White | |
| 4,884,183 A | 11/1989 | Sable | |
| 4,902,957 A | 2/1990 | Cassani et al. | |
| 4,922,404 A | 5/1990 | Ludwig et al. | |
| 4,928,200 A | 5/1990 | Redl et al. | |
| 4,929,882 A | 5/1990 | Szepesi | |
| 4,931,716 A | 6/1990 | Jovanovic et al. | |
| 4,996,638 A | 2/1991 | Orr | |
| 5,028,861 A | 7/1991 | Pace et al. | |
| 5,034,871 A | 7/1991 | Okamoto et al. | |
| 5,066,900 A | 11/1991 | Bassett | |
| 5,068,575 A | 11/1991 | Dunsmore et al. | |
| 5,081,411 A | 1/1992 | Walker | |
| 5,097,196 A | 3/1992 | Schoneman | |
| 5,128,603 A | 7/1992 | Wölfel | |
| 5,134,355 A | 7/1992 | Hastings | |
| 5,138,249 A | 8/1992 | Capel | |
| 5,144,547 A | 9/1992 | Masamoto | |
| 5,170,333 A | 12/1992 | Niwayama | |
| 5,177,676 A | 1/1993 | Inam et al. | |
| 5,179,511 A | 1/1993 | Troyk et al. | |
| 5,184,129 A | 2/1993 | Fung et al. | |
| 5,193,211 A | 3/1993 | Nobusawa | |
| 5,237,606 A | 8/1993 | Ziermann | |
| 5,309,078 A | 5/1994 | Cameron | |
| 5,396,412 A | 3/1995 | Barlage | |
| 5,408,162 A | 4/1995 | Williams | |
| 5,481,178 A | 1/1996 | Wilcox et al. | |
| 5,534,769 A * | 7/1996 | Ishii | 323/283 |
| 5,548,189 A | 8/1996 | Williams | |
| 5,568,044 A | 10/1996 | Bittner | |
| 5,627,460 A | 5/1997 | Bazinet et al. | |
| 5,705,919 A * | 1/1998 | Wilcox | 323/282 |
| 5,912,552 A * | 6/1999 | Tateishi | 323/285 |
| 6,288,524 B1 * | 9/2001 | Tsujimoto | 323/285 |
| 6,307,356 B1 | 10/2001 | Dwelley | |
| 6,385,061 B1 * | 5/2002 | Turchi et al. | 363/21.15 |
| 6,456,050 B1 * | 9/2002 | Agiman | 323/282 |
| 6,580,258 B1 * | 6/2003 | Wilcox et al. | 323/282 |
| 6,873,140 B1 * | 3/2005 | Saggini et al. | 323/283 |

FOREIGN PATENT DOCUMENTS

| | | |
|---|---|---|
| JP | 60-32565 | 2/1985 |
| JP | 60-156269 | 8/1985 |
| JP | 63-307510 | 12/1988 |
| JP | 3-113986 | 11/1991 |
| JP | 4-42771 | 2/1992 |
| JP | 4-49844 | 2/1992 |
| JP | 4-101286 | 9/1992 |
| JP | 4-128086 | 11/1992 |

OTHER PUBLICATIONS

Goodenough, Frank; "Synchronous Rectifier UPS PC Battery Life"; Electronic Design, pp. 47-52, Apr. 16, 1992.

Gracie, Paul D.; "Intermittent Converter Saves Power"; EDN, p. 151, Sep. 1, 1989.

Meakin, Mike; "The LM3578 Switching Power Regulator"; Electronic Engineering, Jul. 1986.

National Semiconductor Corporation; "LM1578/LM2578/LM3578 Switching Regulator"; Preliminary Datasheet; 1987.

Texas Instruments; "TPS5120 Dual Output, Two-Phase Synchronous Buck DC/DC Controller"; Datasheet, Aug. 2000 (revised Mar. 2003).

Texas Instruments; TPS5130 "Triple Synchronous Buck Controller With NMOS LDO Controller"; Datasheet, May 2002.

Texas Instruments; "TPS5140 Four-Channel DC/DC Controller for Notebook PC Power"; Datasheet, Dec. 2000 (revised Jan. 2001).

Texas Instruments; TPS43000 "Multi-Topology High-Frequency PWM Controller", Datasheet; Oct. 2001.

Texas Instruments; "TPS61000, TPS61001, TPS61002, TPS61003, TPS61004, TPS61005, TPS61006, TPS61007 Single- And Dual-Cell Boost Converter With Start-Up Into Full Load"; Datasheet, Mar. 2000 (revised Apr. 2003).

Texas Instruments; TPS61030, TPS61031, TPS61032 "Single-Cell LI or Dual Cell Boost Converter"; Datasheet, Sep. 2002 (revised Feb. 2003).

Texas Instruments; TPS61100, TPS61103, TPS61106, TPS61107 "Dual-Output, Single-Cell Boost Converter"; Datasheet, Jun. 2002 (revised Sep. 2002).

Texas Instruments; TPS61120, TPS61121, TPS61122 "Dual-Output, Single-Cell LI or Dual Cell Boost Converter"; Datasheet, Jun. 2002.

Texas Instruments; TPS61130, TPS61131, TPS61132 "Dual-Output, Single-Cell LI or Dual Cell Sepic Converter"; Datasheet, Jun. 2002.

Texas Instruments; "TPS62000, TPS62001, TOS62003 TPS62004, TPS62005, TPS62006, TPS62007, TPS62008 High-Efficiency Step-Down Low Power DC-DC Converter"; Datasheet, Sep. 2000 (revised Jun. 2002).

Texas Instruments; TPS62050, TPS62051, TPS62052, TPS62054, TPS62056 "800-mA Synchronous Step-Down Converter"; Datasheet, Sep. 2002 (revised May 2003).

Texas Instruments; "Maximum Output Current of the TPS62050"; Application Report, Apr. 2003.

Texas Instruments; "TPS6205xEVM Low-Power, DC-DC EVM for High-Efficiency, Step-Down Converters"; User's Guide, Feb. 2003.

Texas Instruments; TPS62200, TPS62201, TPS62202, TPS62203, TPS62204, TPS62205 "High-Efficiency, SOT23 Step-Down, DC-DC Converter"; Datasheet, Mar. 2002 (revised Oct. 2002).

Texas Instruments; UC28023, UC28025 "Economy High-Speed PWM Controller"; Datasheet, Mar. 2003.

Uchida, Takahito; "Control Circuit for Switching Regulator," Japanese Inventor Associated Disclosed Technology Publication No. 92-2362, published Feb. 15, 1992 (in Japanese, with translation).

Unitrode; "The UC3874 is . . . Good to the last WATT"; Preliminary Datasheet, Feb. 1996.

Unitrode; "Using Bipolar Synchronous Rectifiers Improves Power Supply Efficiency"; Application Note U-103, 1989-1990 Unitrode Semiconductor Databook and Application Notes, pp. 12-88 to 12-94, Jun. 1985.

Unitrode; UCC1582, UCC2582, UCC3582 "High Efficiency Synchronous, Step Down Controller"; Advanced Information Datasheet, Feb. 1995.

Unitrode; UCC1582, UCC2582, UC3582 "High Efficiency Synchronous, Step Down Controller"; Preliminary Datasheet, Jan. 1997.

Unitrode; UC1870—1/ -2, UC2870—1/ -2,UC3870—1/ -2 "High Efficiency, Synchronous, Step-down (Buck) Controllers"; Datasheet, Aug. 1998.

Unitrode; UC1846/7, UC2846/7, UC3846/7 "Current Mode PWM Controller"; Datasheet, Jan. 1997.

Unitrode; UC1874-1,-2, UC2874-1,-2, UC3874-1,-2 "High Efficiency, Synchronous, Step-down (Buck) Controllers"; Preliminary Datasheet, Jan. 1995.

Unitrode; UC1895, UC2895, UC3895 "Synchronous Rectifier Buck PWM Controller"; Advanced Information Datasheet, Oct. 6, 1992.

Unitrode; UCC29421/2, UCC39421/2 Multimode High Frequency PWM Controller; Preliminary Datasheet, Oct. 1999.

Unitrode Products from Texas Instruments; "UCC29421, UCC29422, UCC39421, UCC39422 Multimode High-Frequency PWM Controller"; Datasheet, Oct. 1999 (revised Apr. 2000).

Unitrode Products from Texas Instruments; "TPS62100, TPS62101, TPS62102, TPS62103 Multimode Low-Power Buck Converter"; Datasheet, May 2000 (revised Dec. 2000).

Analog Devices, Inc., "High Efficiency Synchronous Step-Down Switching Regulators ADP1148, ADP1148-3.3, ADP1148-5," Datasheet, pp. 1-14, 1997.

Archer, William R., "Current-Driven Synchronous Rectifier," Motorola TMOS Power FET Design Ideas, BR316, pp. 9-10, 1985.

Archer, William R., "Current Drives Synchronous Rectifier," EDN, p. 279, Nov. 28, 1985.

Blanchard, Richard, et al., "MOSFETs, Schottky Diodes Vie for Low-Voltage-Supply Designs," EDN, p. 197, Jun. 28, 1984.

Borghi et al., "Discontinuous Conduction Mode Power Switching Regulator IC," PCI Oct. 1988 Proceedings, pp. 31-41, Oct. 1988.

Brown, Marty, "Practical Switching Power Supply Design," pp. 20-34, Academic Press, Inc., 1990.

Business Wire, "Micro Linear announces first single-chip power controller for notebook computers," Apr. 16, 1992.

Casey, L.F., "Circuit Design For 1-10 MHZ DC-DC Conversion," Massachusetts Institute of Technology ScD. Thesis, Fig. 3-15, pp. 73-80, 1989.

Cassani, John C. et al., "Sophisticated Control IC Enhances 1MHz Current Controlled Regulator Performance," Proceedings of HFPC, May 1992, pp. 167-173.

Chetty, P.R., "DC timers control dc-dc converters" Electronics, pp. 121 & 123, Nov. 13, 1975.

Chryssis, George, "High-frequency switching power supplies," pp. 144-152 and 180-181, McGraw-Hill, 1989.

Dell Computer Corporation, "Dell Computer Corporation Introduces Advanced Notebook PC," (alleged to contain UC1895, see Unitrode Advance Information Datasheet Oct. 5, 1992), Sep. 1991.

Dinsmore, D., "Dual regulator handles two input voltages," EDN, Jan. 21, 1993.

Fisher, R. A. et al., "Performance of Low Loss Synchronous Rectifiers in a Series-Parallel Resonant DC-DC Converter," Proceedings of the Fourth Annual IEEE Applied Power Electronics Conference and Exposition, pp. 240-246, Mar. 1989.

Gauen, Kim, "Synchronous Rectifier Improves Step-Down Converter Efficiency," PCIM, pp. 8, 11-12 & 14-15, Apr. 1993.

Gontowski et al., "Advanced New Integrated Circuits For Current-Mode Control," Proceedings of the Power Electronics Show and Conference, pp. 341-352, Oct. 1986.

Goodenough, F., "Dozing IC Op Amps Wake Up For Input Signal," Electronic Design, Dec. 5, 1991.

Goodenough, Frank, "Synchronous Rectifier UPS PC Battery Life," Electronic Design, pp. 47-53, Apr. 16, 1992.

Goodenough, Frank, "Low-Voltage Analog ICs Wait in the Wings," Electronic Design, Sep. 3, 1992.

Goodenough, F., "Raise Switcher Efficiency Above 90%", Electronic Design, Jan. 21, 1993.

Gottlieb, I. M., "Practical Power-Control Techniques," Howard W. Sams & Co., pp. 116-120, 1987.

Gottlieb, I. M., Electronic Power Control, TAB Books, pp. 107-111, 1991.

Gracie, Paul D., "Intermittent Converter Saves Power," EDN, p. 151, Sep. 1, 1989.

Graf, Rudolf F., "Modern Dictionary of Electronics," 6th Edition, pp. 402-403, 1984.

Grant, Duncan A. et al., "Power MOSFETS, Theory and Application," pp. 239-256, Wiley-Interscience, 1989.

Harris Semiconductor, Hodgins et al., "HIP 5060 Family of Current Mode Control ICs Enhance 1 MHZ Regulator Performance," Application Note AN9212.1, pp. 11-191 to 11-197, 1992.

Harris Semiconductor, "HIP 5060 Power Control IC Single Chip Power Supply", Datasheet, Apr. 1994.

Harris Semiconductor, "HIP 5060 Power Control IC Single Chip Power Supply", Preliminary Datasheet, Jan. 1992.

Harris Semiconductor, "HIP 5060 Power Control IC Single Chip Power Supply", Datasheet, May, 1992.

Hewett, S., "Improved Switched Mode Power Supply Regulation by Eliminating Turn-off Spikes," IBM Technical Disclosure Bulletin, vol. 31, No. 4, pp. 97-98, Sep. 1988.

Hnatek, Eugene R., "Design of Solid State Power Supplies," Third Edition, pp. 65-70, Van Nostrand Reinhold, 1989.

Horowitz & Hill, "The Art of Electronics," pp. 356-359, Cambridge University Press, 1989.

Huffman, B., "Efficiency and Power Characteristics of Switching Regulator Circuits," Application Note 46, Linear Technology, Nov. 1991.

Ikeda, S. et al., "Power MOSFET for Switching Regulator," International Telecommunications Energy Conference, Oct. 1982.

Impala Linear, "ILC6311 Synchronous 3A Switching Regulator With Auto-Light Load Mode ," Preliminary Datasheet, pp. 30-38, Jan. 1997.

Impala Linear, "ILC6350 Dual Output Synchronous Step-Down DC-DC Controller," Advanced Information Preliminary Datasheet, pp. 1-6, Jan. 1997.

Impala Linear, "ILC6310 Synchronous Step-down DC-DC Converter With Auto Light-Load Mode Select," Final Datasheet, pp. 21-38, Jun. 1996.

Impala Linear, "ILC6330 13A Adjustable Synchronous DC-DC Controller," Preliminary Datasheet, pp. 39-41, Jun. 1996.

International Rectifier, "IR Application Note AN-978, HV Floating MOS Gate Driver ICs, Full Bridge With Current Mode Control," Application Note from web page, Date Unknown.

International Rectifier, "IR Application Note AN-978, HV Floating MOS-Gate Driver ICs, A Typical Block Diagram," Application Note from web page, Date Unknown.

International Rectifier, Clemente et al., "HV Floating MOS-Gate Driver IC," Application Note AN-978A, 1990.

Intersil, "ISL6223 Mobile Microprocessor CORE Voltage Regulator Multi-Phase Buck PWM Controller," Datasheet, Mar. 2001, File No. 9013.

Kassakian, J. et al., "Principles of Power Electronics," pp. 103-165, Addison-Wesley Publishing Company, 1991.

Kerridge, Brian, "Battery power breeds efficient regulators," EDN, pp. 103-108, Mar. 18, 1993.

Lee, Y. S. and Cheng, Y. C., "A 580 kHz switching regulator using on-off control," Journal of the Institution of Electronic and Radio Engineers, vol. 57, No. 5, pp. 221-226, Sep. 1987.

Lee, et al., "Design of Switching Regulator with Combined FM and On-Off Control," IEEE Transactions on Aerospace and Electronic Systems, vol. AES-22, No. 6, pp. 725-731, Nov. 1986.

Linear Technology, "LT1074 Switching Regulator," Preliminary Datasheet, Jun. 1989.

Linear Technology, "LT1072 1.25A High Efficiency Switching Regulator," Datasheet, 1990.

Linear Technology, "New Device Cameos," Linear Technology Magazine, 10:18-19 1992.

Linear Technology, "LTC1148/LTC1148-3.3/LTC1148-5 High Efficiency Synchronous Stepdown Switching Regulator," Preliminary Datasheet, Nov. 1992.

Linear Technology, Wilcox, M., "LT1158 Half Bridge N-Channel Power MOSFET Driver," Datasheet, 1992.

Linear Technology, Williams, J., Application Note 29, "Some Thoughts on DC-DC Converters," 1990 Linear Applications Handbook, pp. AN29-1 to AN29-44, Oct. 1988.

Linear Technology, "LT1524/LT3524 Regulating Pulse Width Modulator," 1990.

Linear Technology, "LT1432 5V High Efficiency Step-Down Switching Regulator Controller," 1992 Linear Databook Supplement, pp. 4-145 to 4-171.

Linear Technology, "LT1170/LT1171/LT1172 100kHz 5A, 2.5A, 1.25A High Efficiency Switching Regulators," Data Sheet, 1991.

Linear Technology, "LT1271/LT1269 4A High Efficiency Switching Regulators," Data Sheet, 1992.

Linear Technology, Pietkiewicz et al., "DC-DC Converters for Portable Computers," Design Note 52, 1991.

Linear Technology, Nelson, C., App. Note 19, "LT-1070 Design Manual," Jun. 1986.

Linear Technology, "LTC1873 Dual 550 kHz Synchronous 2-Phase Switching Regulator Controller With 5-Bit VID," Datasheet, 1999.

Linear Technology, "LTC1878 High Efficiency Monolithic Synchronous Step-Down Regulator," Initial Release, Final Electrical Specifications, May 2000.

Linear Technology, "LTC1702 Dual 550 kHz Synchronous 2-Phase Switching Regulator Controller," Datasheet, 1999.

Linear Technology, Williams, J., App. Note 25, "Switching Regulators for Poets," Sep. 1987.

Linear Technology, "LT1846/1847, LT3846/3847 Current Mode PWM Controller," Datasheet, 1990.

Linear Technology, "LTC1703 Dual 550 kHz Synchronous 2-Phase Switching Regulator Controller with 5-Bit VID," Datasheet, 1999.

Linear Technology, "LTC1735 High Efficiency Synchronous Step-Down Switching Regulator," Datasheet, 1998.

Linear Technology, "LTC1736 5-Bit Adjustable High Efficiency Synchronous Step-Down Switching Regulator," Datasheet, 1999.

Linear Technology, "LTC1775 High Power NO RSENSE™ Current Mode Synchronous Step-Down Switching Regulator," Datasheet, 1999.

Linear Technology, Williams, J., Application Note 35, "Step Down Switching Regulators," 1990 Linear Applications Handbook, pp. AN35-1 to AN35-32, Aug. 1989.

Linear Technology, "LTC1436A/LTC1436A-PLL/LTC1437A High Efficiency Low Noise Synchronous Step-Down Switching Regulators," Datasheet, 1996.

Linear Technology, "LTC1438/LTC1439 Dual High Efficiency, Low Noise, Synchronous Step-Down Switching Regulators," Datasheet, 1997.

Linear Technology, Nelson., C., "The LT1432:5 Volt Regulator Achieves 90% Efficiency," Linear Technology Magazine, vol. 2, No. 1, pp. 18-19, Feb. 1992.

Linear Technology, Pietkiewicz, S., "A Low-Voltage, Micro-Power 1 Amp Switching Regulator," presented at the International Solid State Circuits Conference, 1990.

Linear Technology, "LT1073 Micropower DC-DC Converter Adjustable and Fixed 5V, 12V," Datasheet, 1991.

Linear Technology, "LTC1538-AUX/LTC1539 Dual High Efficiency, Low Noise, Synchronous, Step-Down Switching Regulators," Datasheet, 1996.

Linear Technology, "LTC1142/LTC1142L/LTC1142HV Dual High Efficiency Synchronous Step-Down Switching Regulators," Datasheet, 1995.

Linear Technology, "LTC1149/LTC1149-3.3/LTC1149-5 High Efficiency Synchronous Step-Down Switching Regulators," Datasheet, 1993.

Linear Technology, "LTC1627 Monolithic Synchronous Step-Down Switching Regulator," Datasheet, 1998.

Linear Technology, "LTC1159/LTC1159-3.3/LTC1159-5 High Efficiency Synchronous Step-Down Switching Regulators," Datasheet, 1994.

Linear Technology, "LTC1435 High Efficiency Low Noise Synchronous Step-Down Switching Regulator," Datasheet, 1996.

Linear Technology, "LTC1267/LTC1267-ADJ/LTC1267-ADJ5 Dual High Efficiency Synchronous Step-Down Switching Regulators," Datasheet, 1995.

Linear Technology, "LTC1266/LTC1266-3.3/LTC1266-5 Synchronous Regulator Controller for NB or P-Channel MOSFETs," Datasheet, 1995.

Markus, John, "Guidebook of Electronic Circuits," pp. 647 & 649, 1971.

Maxim Integrated Products, Inc., "MAX638 Fixed +5V CMOS Step-Down switching Regulator," Maxim 1989 Integrated Circuits Data Book, pp. 6-57 to 6-64, 1989.

Maxim Integrated Products, Inc., "MAX782/MAX786 Notebook Computer Power Supplies," Advance Information Data Sheet, Feb. 1993, pp. 1-8.

Maxim Integrated Products, "MAX1630-MAX1635 Multi-Output, Low-Noise Power Supply Controllers for Notebook Computers," Datasheet Rev. 3; Apr. 1997.

Maxim Integrated Products, "Max798 High-Accuracy Step-Down Controller With Synchronous Rectifier for CPU Power," Datasheet, Dec. 1996.

Maxim Integrated Products, "MAX796/MAX797/MAX799 Step-Down Controllers With Synchronous Rectifier for CPU Power," Datasheet Rev. 3a; Nov. 1997.

Maxim Integrated Products, Inc., MAX782, Addendum to Advance Information Sheet and EV Kit Document, bearing Bates Nos. L07760-007785, contains dates in Feb. 1993 and Mar. 1993 (MAX782 Advance Information Data Sheet cited above).

Maxim Integrated Products, Inc., "MAX635/36/37 Fixed Output CMOS Inverting Switching Regulators," Maxim 1989 Integrated Circuits Data Book, pp. 6-49 to 6-46, 1989.

Maxim Integrated Products, Inc., "MAX639 High-Efficiency, +5V Adjustable Step-Down Switching Regulator," Datasheet, Dec. 1991.

Maxim Integrated Products, Inc., "MAX635/636/637 Preset/Adjustable Output CMOS Inverting Switching Regulators," Datasheet, Date Unknown.

Maxim Integrated Products, "MAX782 Triple-Output Power-Supply Controller for Notebook Computers," Datasheet Rev. 2; May 1994.

Maxim Integrated Products, Inc., "MAX783 Triple-Output Power-Supply Controller for Notebook Computers," Datasheet, May 1994.

Maxim Integrated Products, "MAX887 100% Duty Cycle, Low-Noise, Step-Down PWM DC-DC Converter," Datasheet, Sep. 1996.

Maxim Integrated Products, Inc., "MAX746 High-Efficiency, PWM, Step-Down, N-Channel DC-DC Controller," Datasheet, Nov. 1993.

Maxim Integrated Products, Inc., "MAX747 High-Efficiency PWM, Step-Down P-Channel DC-DC Controller," Datasheet, Sep. 1993.

Maxim Integrated Products, Inc., "MAX777L/MAX778L/MAX779L Low-Voltage Input, 3V/3.3V/5V/ Adjustable Output, Step-Up DC-DC Converters," Datasheet, Jul. 1996.

Maxim Integrated Products, "MAX767 5V-to3.3V, Synchronous, Step-Down Power-Supply Controller," Datasheet Rev. 2; Aug. 1994.

Meakin, Mike, "The LM3578 Switching Power Regulator," Electronic Engineering, pp. 47-52, Jul. 1986.

Micro Linear Corporation, "ML4861 Low Voltage Boost Regulator," Preliminary Datasheet, Jul. 1992.

Micro Linear Corporation, "ML 4822 DC/DC Converter Controller for Portable Computers," Datasheet, Aug. 1991.

Micro Linear Corporation, "ML4862 EVAL User's Guide," Jun. 1992.

Micro Linear Corporation, "ML4873 Battery Power Control IC," Datasheet, Jan. 1997 (preliminary version Mar. 1993—cited below).

Micro Linear Corporation, "ML4862 Battery Power Control IC," Datasheet, Mar. 1997.

Micro Linear Corporation, "ML4862 Battery Power Control IC," Advance Information Datasheet, Jul. 1992.

Micro Linear Corporation, "ML486 Battery to DC Power Control IC for Portable Systems," Advanced Information, Feb. 1992.

Micro Linear Corporation, "ML4873 Battery Power Control IC," Advance Information Data Sheet, Mar. 15, 1993, pp. 1-8.

Myers, R. and Peck, R., "200-kHz Power FET Technology in New Modular Power Supplies," Hewlett-Packard Journal, Aug. 1981.

NASA Jet Propulsion Laboratory,* "Synchronous Half-Wave Rectifier," Jul. 1989.

National Semiconductor Corporation, "LM1578/LM2578/LM3578 Switching Regulator," Preliminary Datasheet, 1987.

Patel, Raoji, "Using Bipolar Synchronous Rectifiers Improves Power Supply Efficiency," Proceedings of the Power Sources Conference, Nov. 1984.

Patel, R., "Bipolar synchronous rectifiers cut supply losses," EDN, Apr. 4, 1985.

Quinnell, Richard A., "Analog IC Combines Five Functions for Battery Power Management," EDN, Apr. 23, 1992.

Redl et al., "Frequency Stabilization and Synchronization of Free-Running Current-Mode Controlled Converters," PESC '86 Record, pp. 519-530, 1986.

Redl, et al., "Overload-Protection Methods For Switching-Mode DC/DC Converters: Classification, Analysis, and Improvements," PESC '87 Record, pp. 107-118, 1987.

Rippel, W.E., "Synchronous Half-Wave Rectifier," NASA Jet Propulsion Laboratory Technical Support Package vol. 13, No. 7, Item #15, Jul. 1989.

Sakai, E. and Harada, K., "A New Synchronous Rectifier Using Bipolar Transistor Driven by Current Transformer," Fourteenth International Telecommunications Energy Conference, pp. 424-429, Oct. 1992.

Sakai, E. and Harada K., "Synchronous Rectifier Using a Bipolar Transistor Driven by Current Transformer," Journal of the Society of Electronic Data Communication, vol. J-74-B-I, No. 8, pp. 639-646, Aug. 1991 (in Japanese, with translation).

Savant, C.J., Jr., et al., "Electronic Design: Circuits and Systems," pp. 612-613, The Benjamin/Cummings Publishing Co., 1991.

Shepard, J., "Powering portable systems," EDN, Nov. 5, 1992.

Siliconix, "Si91XX Synchronous Buck Controller," Objective Specification, Dec. 20, 1990.

Siliconix, "Siliconix Si9110/SI9111," Datasheet, Oct. 1987.

Siliconix, "Synchronous Rectification," Design Ideas, Oct. 1980.

Siliconix, "Si9150 Synchronous Buck Regulator Controller, S-42677, Rev. D," Datasheet, Feb. 14, 1995.

Siliconix, "High-Efficiency Buck Converter for Notebook Computers," Application Note AN92-4, Date Unknown.

Siliconix, "Designing DC/DC Converters with the Si9110 Switchmode Controller," Siliconix Power Products Data Book, 1991.

Siliconix, "Si9150CY/BCY Synchronous Buck Converter Controller," Preliminary Data Sheet, Oct. 8, 1992.

Siliconix, "Si9150 Synchronous Buck Converter Controller," Objective Specification, handwritten pp. 7-17, Sep. 10, 1991.

Siliconix, Si9150 documents bearing Bates Nos. U040269-71, 9104.

Soclof, Sidney, "Applications of Analog Integrated Circuits," Figure 2.25, pp. 74-75, Prentice-Hall, Inc. 1985.

Sokal et al., "Control Algorithms and Circuit Designs For Optimally Flyback-Charging an Energy-Storage Capacitor," IEEE Fifth Applied Power Electronics Conference, pp. 295-301, 1990.

Steigerwald, R., "High-Frequency Resonant Transistor DC-DC Converters," IEEE Transactions on Industrial Electronics, vol. IE-31, No. 2, pp. 181-191, May 1984.

Taylor, "Flyback Converter," Electronic Engineering, p. 23, Jul., 1976.

Toyoda, "SB3012P Step Down DC-DC Converter Controller," Datasheet, Mar. 1997.

Toyoda, "SB3030P Step Down DC-DC Converter Controller," Datasheet, Dec. 1996.

Toyoda, "SB3011P Step Down DC-DC Converter Controller," Datasheet, Mar. 1997.

Toyoda, "SB3052P Dual Channel Step Down DC-DC Converter Controller," Datasheet, Feb. 1998.

Toyoda, "SB3020P Dual Channel Step Down DC-DC Converter Controller," Datasheet, Mar. 1997.
Toyoda, "SB3010P Synchronous Stepdown DC-DC Converter Controller," Datasheet Aug. 10, 1995.
Toyoda, "SB3013P Step Down DC-DC Converter Controller," Datasheet, Mar. 1997.
Toyoda, "SB3050P Dual Channel Step Down DC-DC Converter Controller," Datasheet, Mar. 1997.
Toyoda, "SB3031P Step Down DC-DC Converter Controller," Datasheet, Dec. 1996.
Uchida, Takahito, "Control Circuit for Switching Regulator," Japanese Inventor Associated Disclosed Technology Publication No. 92-2362, published Feb. 15, 1992 (in Japanese, with translation).
Unitrode, "Using Bipolar Synchronous Rectifiers Improves Power Supply Efficiency," Application Note U-103, 1989-1990 Unitrode Semiconductor Databook and Application Notes, pp. 12-88 to 12-94, Jun. 1985.
Unitrode, "UC1846/7, UC2846/7, UC3846/7 Current Mode PWM Controller," Datasheet, Jan. 1997.
Unitrode, "UCC29421/2, UCC39421/2 Multimode High Frequency PWM Controller," Preliminary Datasheet, Oct. 1999.
Unitrode, "UC1874-1,-2, UC2874-1,-2 UC3874-1,-2 High Efficiency, Synchronous Step-Down (Buck) Controllers," Datasheet, Feb. 1998.
Unitrode, "UC1895, UC2895, UC3895 Synchronous Rectifier Buck PWM Controller," Advance Information Datasheet, Oct. 6, 1992.
Unitrode, "UC170-1/-2, UC2870-1/-2, UC3870-1/-2 High Efficiency, Synchronous, Step-Down (Buck) Controllers," Datasheet, Aug. 1998.
Unitrode, "UCC3941-3/-5/ADJ 1V Synchronous Boost Converter," Preliminary Datasheet, Mar. 1997.
Unitrode, "UCC19411/2/3, UCC29411/2/3, UCC39411/2/3 Low Power Synchronous Boost Converter," Preliminary Datasheet, Apr. 1998.
Unitrode, "UCC1582, UCC2582, UCC3582 High Efficiency Synchronous, Step Down Controller," Preliminary Datasheet, Jan. 1997.
Wilcox, M., "The LT1158: Low Voltage, N-Channel Bridge Design Made Easy," Linear Technology Magazine, vol. 2, No. 1, Feb. 1992.
Williams, J. and Huffman, B., "Proper instrumentation eases low-power dc/dc converter design," EDN, Oct. 27, 1988.
Williams, J., "Basic Principles and Ingenious Circuits Yield Stout Switchers," EDN, Jan. 18, 1990.
Williams, J., "Signal conditioning circuits use *power design techniques," EDN, Aug. 20, 1987.
Williams, J., "Employ pulse-width modulators in a wide range of controllers," EDN, Sep. 2, 1981.
Williams, J., "Switching regulator takes on more power," Electronic Product Design, Jan. 1986.
Williams, J., "Design dc-dc converters to catch noise at the source," Electronic Design, Oct. 15, 1981.
Williams, J., "Conversion techniques adapt voltages to your needs," EDN, Nov. 10, 1982.
Williams, J., "Special circuit-design techniques enhance regulator performance," EDN, Sep. 1, 1983.
Williams, J., "Use low-power design methods to condition battery outputs," EDN, Oct. 18, 1984.
Williams, J., "Chopper amplifier improves operation of diverse circuits," EDN, Mar. 7, 1985.
Williams, J., "Refine V/F-converter operation with novel design techniques," EDN, May 30, 1985.
Williams, J. and Huffman, B., "Design dc/dc converters for power conservation and efficiency," EDN, Nov. 10, 1988.
Williams, J. and Waller, B., "Performance-Enhancement Techniques for Three-Terminal Regulators," New Electronics, Oct. 4, 1983.
Williams, J. and Huffman, B., "Switched-capacitor networks simplify dc/dc-converter designs," EDN, Nov. 24, 1988.
Williams, J., "Regulator IC speeds design of switching power supplies," EDN, Nov. 12, 1987.
Williams, J., "Micropower circuits assist low-current signal conditioning," EDN, Aug. 6, 1987.
Williams, J. and Huffman, B., "Precise converter designs enhance system performance," EDN, Oct. 13, 1988.
Williams, J. and Dendinger, S., "Simplify feedback controllers with a 2-quadrant PWM IC," EDN, May 26, 1983.
Williams, J., "Bridge forms synchronous rectifier," EDN.
Williams, J., "Designing supplies for powering LCD backlighting," EDN, Oct. 29, 1992.
Williams, J., "1.5 to 5V converter supplies 200mA," EDN, Oct. 15, 1992.
Williams, J., "Design linear circuits that serve digital system needs," EDN, Apr. 27, 1989.
Williams, J., "Clever techniques improve thermocouple measurements," EDN, May 26, 1988.
Williams, J., "Design techniques extend V/F-converter performance," EDN, May 16, 1985.
Williams, J., "Design linear circuits for 5V operation," EDN, May 2, 1985.
Williams, J., "Considerations for Five Volt Linear Circuits," Professional Program Session Record 20, Circuits for Analog Signal Processing and Data Conversion in Single +5V Supply Systems, Wescon/85, Nov. 1985.
Williams, J., "Analog circuits operate from a 1.5V cell," EDN, Sep. 19, 1985.
Williams, J., "Astute designs improve efficiencies of linear regulators," EDN, Aug. 17, 1989.
Williams, J., "Galvanically isolated switching supplies provide high power," EDN, Nov. 26, 1987.
Williams, J., "Correcting power-supply problems," EDN, Oct. 10, 1991.

* cited by examiner

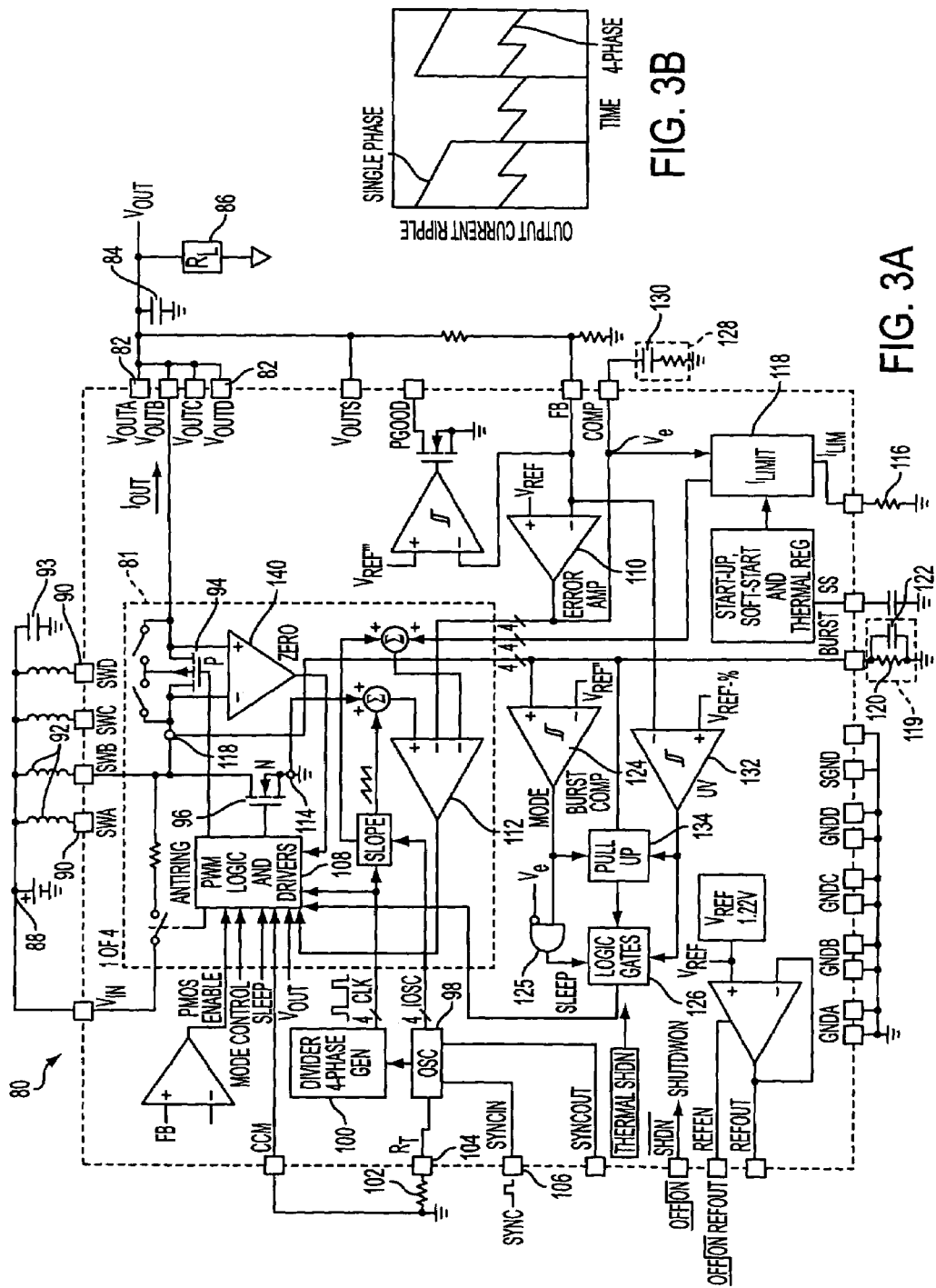

METHODS AND CIRCUITS FOR PROGRAMMABLE AUTOMATIC BURST MODE CONTROL USING AVERAGE OUTPUT CURRENT

FIELD OF THE INVENTION

The present invention relates to power converter circuits. More particularly, the present invention relates to methods and circuits for power converters that automatically transition into and out of a low power consumption mode based on load current.

BACKGROUND OF THE INVENTION

Voltage regulators, also known as power converters, provide a regulated output voltage from a voltage source that may be poorly-specified or fluctuating, or that may be at an inappropriate amplitude for the load. Such regulators may employ a switching circuit that includes one or more switching elements coupled in series or in parallel with the load. The switching elements may be, for example, power metal-oxide semiconductor field-effect transistor (MOSFET) switches.

Control circuitry regulates the output voltage and the current supplied to the load by cycling the switch circuit between ON and OFF states. The duty cycle of the switch circuit controls the flow of power to the load, and can be varied by a variety of methods. For example, the duty cycle can be varied by (1) fixing the pulse stream frequency and varying the ON or OFF time of each pulse, (2) fixing the ON or OFF time of each pulse and varying the pulse stream frequency, or (3) a combination thereof.

To vary the ON or OFF time of each pulse or the pulse stream frequency, the control circuitry may monitor the regulator's output voltage and generate a feedback signal $V_e$ that is proportional to the difference between the regulator's output voltage and the regulated voltage. $V_e$ may be used to provide either "voltage-mode" or "current-mode" regulation. In voltage-mode regulation, $V_e$ and a periodic sawtooth waveform $V_s$ may be provided as inputs to a comparator, the output of which controls the duty cycle of the switch circuit. In current-mode regulation, a voltage $V_i$ may be generated that is proportional to the current in the output inductor, and $V_i$ and $V_e$ may be provided as inputs to a comparator, the output of which controls the duty cycle of the switch circuit.

Synchronous switching regulators include at least two switching elements that typically are driven by non-overlapping drive signals to supply current at a regulated voltage to a load. Synchronous switching regulators that use power MOSFET switches frequently are used in portable battery-powered electronic products and thermally-sensitive products. These regulators convert the typically fluctuating input voltage to a regulated output voltage. Such regulators provide high operating efficiency and thus long battery life with little heat generation.

One problem with switching regulators is that the efficiency of the regulator decreases as the load current is reduced to low levels due to switching and quiescent losses. This is particularly problematic in battery-powered applications, which may spend much of their operating time in a low power draw mode (i.e., when load current demand is low).

To maintain high efficiency at light load, thereby increasing battery life, switching power converters may transition from a NORMAL operating mode, e.g., a fixed frequency pulse-width modulation (PWM) mode of operation, to a low power consumption mode in which switching and quiescent losses are significantly reduced. One example of a low power consumption mode is a BURST mode operation, which sometimes also is referred to as a type of pulse frequency modulation with intermittent bursts of pulses. In BURST mode, the voltage regulator operates sufficiently long to bring the output voltage into regulation, after which the converter transitions into SLEEP mode. In SLEEP mode, all switching stops and all the active switching elements are maintained OFF for a period of time that varies as a function of load current, the quiescent current of the converter is reduced, and the load is supported by energy stored in an output capacitor. During SLEEP, additional components of the power converter can be but need not be turned OFF. When the output voltage decreases below a threshold level, e.g., 1% below the regulated value, the converter "awakens" from SLEEP mode and resumes switching until the output voltage again is within regulation limits, at which point the converter resumes SLEEP mode. Alternatively, some switching power converters may transition directly from NORMAL operation to SLEEP mode, maintaining all active switching elements OFF and reducing quiescent current to reduce power consumption. In this manner, high efficiency can be maintained over a wide range of load current since the time spent in SLEEP mode increases as the load current demand is reduced.

When the power converter is subjected to heavier loads, however, NORMAL operating mode, in which the converter switch continuously alternates between an ON state and an OFF state to maintain the output voltage at the regulated level, may be more beneficial than BURST mode operation. Accordingly, the converter may be configured for transition between NORMAL operating mode and BURST mode as the load varies.

Some applications may be able to provide a mode control signal, giving the converter "advance warning" of an impending increase or decrease in load. There are other applications in which a user cannot provide this control, and the converter must be able to switch between modes automatically, based on load, while maintaining regulation.

Preferably, a burst mode control circuit would have means of sensing average load current and switch between modes automatically based on a user-programmed current threshold. It would also respond quickly to sudden load changes, and easily be controlled by the host for manual operation, while requiring a minimum number of components.

There are a number of existing methods for implementing automatic mode control (see, e.g., U.S. Pat. No. 5,481,178 to Wilcox et al.). One method used by current mode converters is to sense load current by monitoring output voltage from a feedback error amplifier. When this voltage drops below a predetermined level, indicating a certain peak inductor current, the converter goes into SLEEP mode. The converter comes out of the SLEEP mode when the output voltage has dropped below a pre-defined threshold. Thereafter, the converter wakes up and resumes switching. The major problem with this method is that the error voltage is an indication of peak inductor current, not average load current. This may cause the mode transition point to vary as much as 10:1, as a function of the $V_{IN}/V_{OUT}$ ratio, inductance, and switching frequency. It also is restricted to converters using current mode control.

Another method is described in the datasheet for Unitrode's UC1874 buck regulator. The UC1874 employs fixed frequency average current mode control and improves light load efficiency with a programmable standby mode during which the MOSFET drivers and the oscillator are disabled.

The UC1874 senses average output current by monitoring voltage from a feedback error amplifier. When that voltage, which is indicative of the average output current, drops below a programmable voltage threshold, the converter transitions into the standby mode. One problem with the UC1874 is that the output signal from the error amplifier is accurate only during steady state conditions. During transient conditions, the output voltage from the error amplifier may not be an accurate indication of the average output current due to potential lags in responsiveness that result from employment of average current-mode control.

Another mode control method and circuit is based on the sensing of discontinuous inductor current as an indication of light load. This circuit is not easily programmable, and is subject to large mode threshold variation with $V_{IN}$, $V_{OUT}$, inductance, and switching frequency. Furthermore, such a circuit also may require a larger, more expensive inductor having a greater inductance to achieve the desired load transition threshold.

In view of the foregoing, it would be desirable to provide methods and circuits for controlling a voltage regulator having a smooth and repeatable transition between operating modes.

It also would be desirable to provide methods and circuits for automatic transition of a voltage regulator into and out of a low power consumption mode at a mode transition point or threshold that can be set independently of input voltage, output voltage, inductance, and switching frequency.

It further would be desirable to provide methods and circuits for automatic transition of a voltage regulator into and out of a low power consumption mode in which the mode transition point or threshold is easily programmable.

It even further would be desirable to provide methods and circuits for automatic transition of a voltage regulator into and out of a low power consumption mode that may be used in conjunction with voltage mode or current mode control to vary the duty cycle of a switch.

In addition, it would be desirable to provide methods and circuits for transition between operating modes by manual override.

SUMMARY OF THE INVENTION

In view of the foregoing, it is an object of the present invention to provide methods and circuits for controlling a voltage regulator having a smooth and repeatable transition between operating modes.

It also is an object of the present invention to provide methods and circuits for automatic transition of a voltage regulator into and out of a low power consumption mode at a mode transition point or threshold that can be set independently of input voltage, output voltage, inductance, and switching frequency.

It further is an object of the present invention to provide methods and circuits for automatic transition of a voltage regulator into and out of a low power consumption mode in which the mode transition point or threshold is easily programmable.

It even further is an object of the present invention to provide methods and circuits for automatic transition of a voltage regulator into and out of a low power consumption mode that may be used in conjunction with voltage mode or current mode control to vary the duty cycle of a switch.

In addition, it is an object of the present invention to provide methods and circuits for transition between operating modes by manual override.

These and other objects of the present invention are accomplished by providing methods and circuits that automatically transition a power converter into and out of a low power consumption mode based on load current demand by monitoring output current and averaging the monitored output current to develop a signal indicative of average output current. In one embodiment, a synchronous switching regulator is provided having a circuit that monitors and averages the regulator's output current, creating a voltage signal indicative of the average output current. When the indicative voltage is greater than a user-programmable mode transition threshold, indicating a high load current demand, the voltage regulator commands a NORMAL operating mode (e.g., fixed frequency mode) in which the output voltage is maintained at the regulated level by continuously adjusting inductor current $I_L$. When the indicative voltage is less than the user-programmable mode transition threshold, indicating a low load current demand, the voltage regulator commands BURST mode. A user may easily program the average output current, and thereby the load current demand, at which mode transition occurs by selection of a resistor. Advantageously, the methods and circuits of the present invention permits the duty cycle of the voltage regulator to be controlled using either current mode or voltage mode control.

Embodiments also may be configured to permit a user to override the automatic mode transition and manually or digitally control transition into and out of BURST mode.

BRIEF DESCRIPTION OF THE DRAWINGS

Further features of the present invention, its nature and various advantages will be more apparent from the accompanying drawings and the following detailed description, in which:

FIG. 3A is a block diagram of a synchronous 4-phase boost voltage regulator employing an embodiment of the automatic BURST mode control circuit of the present invention;

FIG. 3B is a graph of output ripple current with single and 4-phase boost regulation;

DETAILED DESCRIPTION OF THE INVENTION

To increase the efficiency of a power converter, the present invention comprises methods and circuits that may be integrated into the power converter circuit to automatically transition the power converter into BURST mode when load current demand is low and out of BURST mode when the load current demand is high. The present invention, an illustrative embodiment of which is shown in FIG. 1A, transitions power converter control circuit 10 into and out of BURST mode responsive to load current demand by monitoring output current ($I_{OUT}$) and developing a signal indicative of an average of the monitored output current ($I_{OUT, AVG}$).

In particular, power converter control circuit 10 regulates the output voltage $V_{OUT}$ by controlling the converter output current such that the average output current supplied to output capacitor $C_{OUT}$ is sufficient to support the current drawn from the output capacitor by the load at an output voltage $V_{OUT}$ within a desired range of a nominal regulated value. When load current demand is low, average output current $I_{OUT,AVG}$ also is low. Likewise, when load current demand is high, so too is the average output current. Accordingly, BURST mode control circuit 12 of the present invention senses low load current demand by sensing low average output current.

Figure 1A:
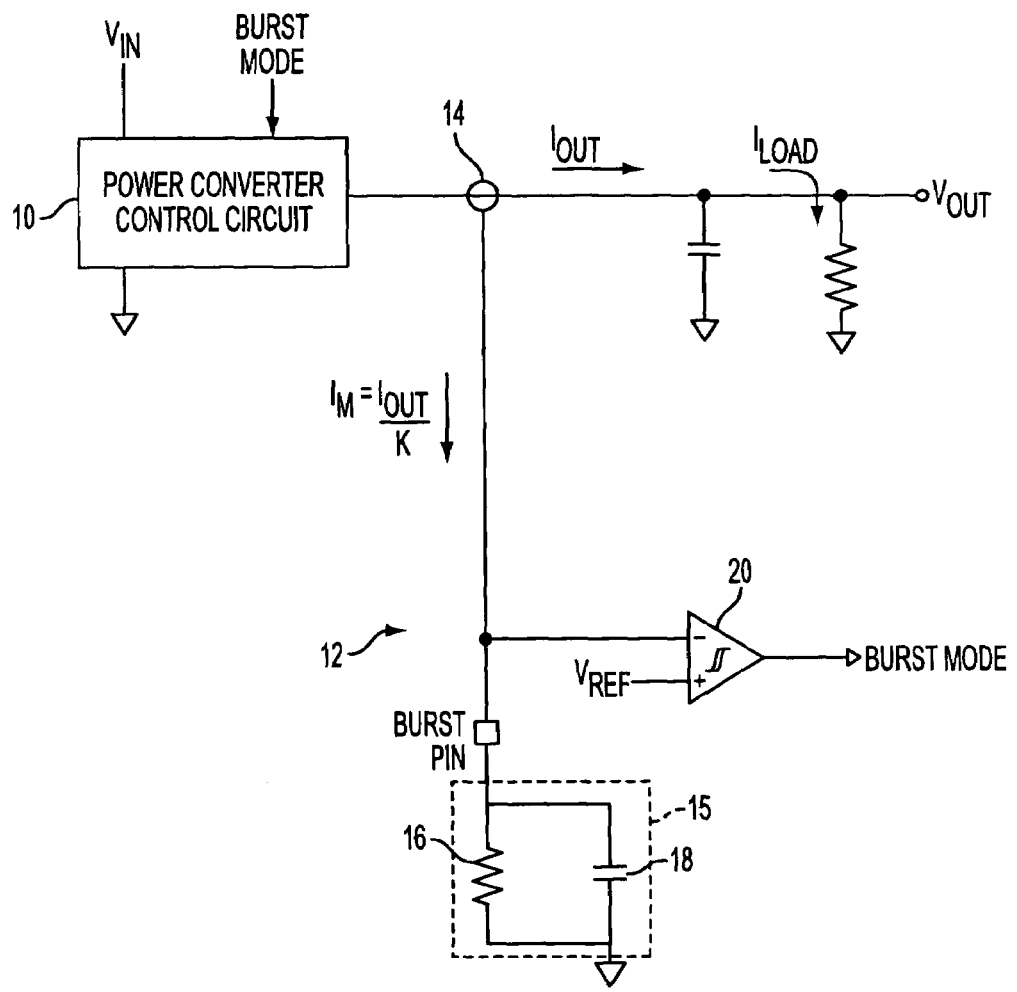
FIG. 1A is a simplified block diagram of an embodiment of the present invention for automatically transitioning a power converter into and out of BURST mode.

In the embodiment of the present invention illustrated in FIG. 1A, BURST mode control circuit 12 includes current mirror 14 that monitors output current $I_{OUT}$ and generates a current proportional to output current $I_{OUT}$. The current ($I_{OUT}/K$) generated by the current mirror, an illustrative embodiment of which is provided in greater detail hereinbelow, may be a small fraction of the output current. Because output current $I_{OUT}$ comprises a pulsed current that is a function of the switching frequency of converter control circuit 10, $V_{OUT}$, $V_{IN}$, and the inductance of an inductor of the power converter, mirrored current $I_m$ also is pulsed in nature. Mirrored current $I_m$ is fed to user-programmable filter 15 having programming resistor 16 ($R_{BURST}$) and filtering capacitor 18, the capacitance of which is selected to filter the pulses of mirrored current $I_m$ and reduce the ripple of the voltage that is generated across resistor 16 and capacitor 18. That voltage ($V_{BURST}$) is indicative of average output current $I_{OUT,AVG}$ and used to transition the power converter automatically into and out of BURST mode.

In particular, $V_{BURST}$ is fed into the inverting input of hysteretic comparator 20 and compared to a reference voltage that is fed into the non-inverting input of hysteretic comparator 20. When $V_{BURST}$ falls below a first user-programmable mode transition threshold, indicating a light load current demand, hysteretic comparator 20 outputs a signal HIGH that commands converter control circuit 10 to operate in BURST mode. Hysteresis of comparator 20 prevents oscillation between modes due to ripple voltage on capacitor 18. The capacitance of capacitor 18 preferably is selected to reduce ripple to less than the hysteresis of comparator 20. When $V_{BURST}$ increases beyond a second, higher user-programmable mode transition threshold, indicating a heavy load current demand, hysteretic comparator 20 outputs a signal LOW that is fed back to power converter control circuit 10 to transition out of BURST mode and command NORMAL operation of the converter. Illustrative NORMAL operational modes include fixed frequency or variable frequency operation with continuous or discontinuous current, e.g., as described with respect to the voltage converter of FIG. 1 of U.S. Pat. No. 5,481,178 to Wilcox et al. As used herein, the term "user-programmable" refers to the capability of varying parameters of the power converter with external components.

In accordance with one aspect of the present invention, a user may program power converter control circuit 10 to transition into and out of BURST mode at a desired average output current by a calculated or empirical selection of an appropriate value for the resistance of programming resistor 16. In particular, programming resistor 16 ($R_{BURST}$) may be selected based on the following equation:

$$R_{BURST} = K * V_{REF} / I_{BURST}$$

where K is the mirror ratio $I_{OUT}/I_M$, $V_{REF}$ is the reference voltage at the non-inverting input of hysteretic comparator 20, and $I_{BURST}$ approximately is the average output current and, and thus the load current, at which the power converter transitions into and out of BURST mode, neglecting the small voltage ripple across capacitor 18 and the hysteresis of comparator 20.

For example, if K is 2000:1, $V_{REF}$ is 1.0V, and $R_{BURST}$ is 10 kΩ, power converter control circuit 10 transitions into and out of BURST mode at an average output current of approximately 200 mA, neglecting the small voltage ripple across capacitor 18 and the hysteresis of comparator 20. Accordingly, for load current demands greater than approximately 200 mA, BURST mode control circuit 12 would command converter control circuit 10 to operate in NORMAL mode. However, when the load current demand decreases to less than approximately 200 mA, BURST mode control circuit 12 would automatically transition converter control circuit 10 to BURST mode operation. Of course, one of ordinary skill in the art would appreciate that the current ratio, reference voltage and resistance values may be modified based on design choice.

Advantageously, the design of the present invention permits a user to easily program the mode transition point independently of input voltage $V_{IN}$, output voltage $V_{OUT}$, inductance, or switching frequency. Furthermore, the high-efficiency circuit of the present invention may be integrated with any converter topology (e.g., buck, boost, inverter, or combinations thereof) and used with either current or voltage mode control.

Programming resistor 16 and filtering capacitor 18 may be replaced by other known user-programmable filter circuits that average the pulsed nature of mirrored current $I_M$ to generate an output signal that may be employed by hysteretic BURST comparator 20 to automatically transition power converter control circuit 10 into and out of BURST mode. The mode transition control circuit of FIG. 1A also may be used to transition the power converter into SLEEP mode directly from NORMAL operating mode and out of SLEEP mode directly into NORMAL operating mode.

Figure 1B:
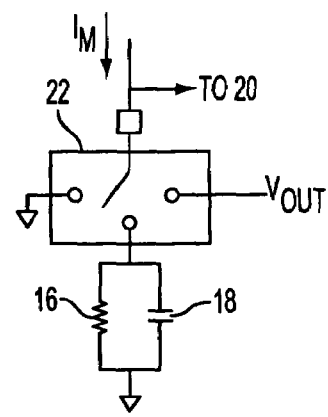
FIG. 1B is a partial block diagram of a circuit that permits a user to manually control transition of a voltage regulator into and out of BURST mode.

In accordance with another aspect of the present invention, BURST mode control circuit 12 may be configured to permit manual transition of the voltage regulator into and out of BURST mode. More specifically, a user may force circuit 12 to operate in BURST mode by sinking the BURST PIN to ground or to operate in NORMAL mode by pulling the BURST PIN up to a voltage greater than $V_{REF}$ (but preferably no greater than $V_{OUT}$). To facilitate manual transition, user-actuable switch 22 optionally may be provided, as illustrated in FIG. 1B. For example, switch 22 may be coupled to ground in a first position and coupled to $V_{OUT}$ in a second position. Switch 22 may comprise an optional third position in which the switch may be coupled to programming resistor 16 and filtering capacitor 18 to enable automatic transition into and out of BURST mode. Alternatively, switch 22 also may comprise a digitally programmable switch.

Figure 2:
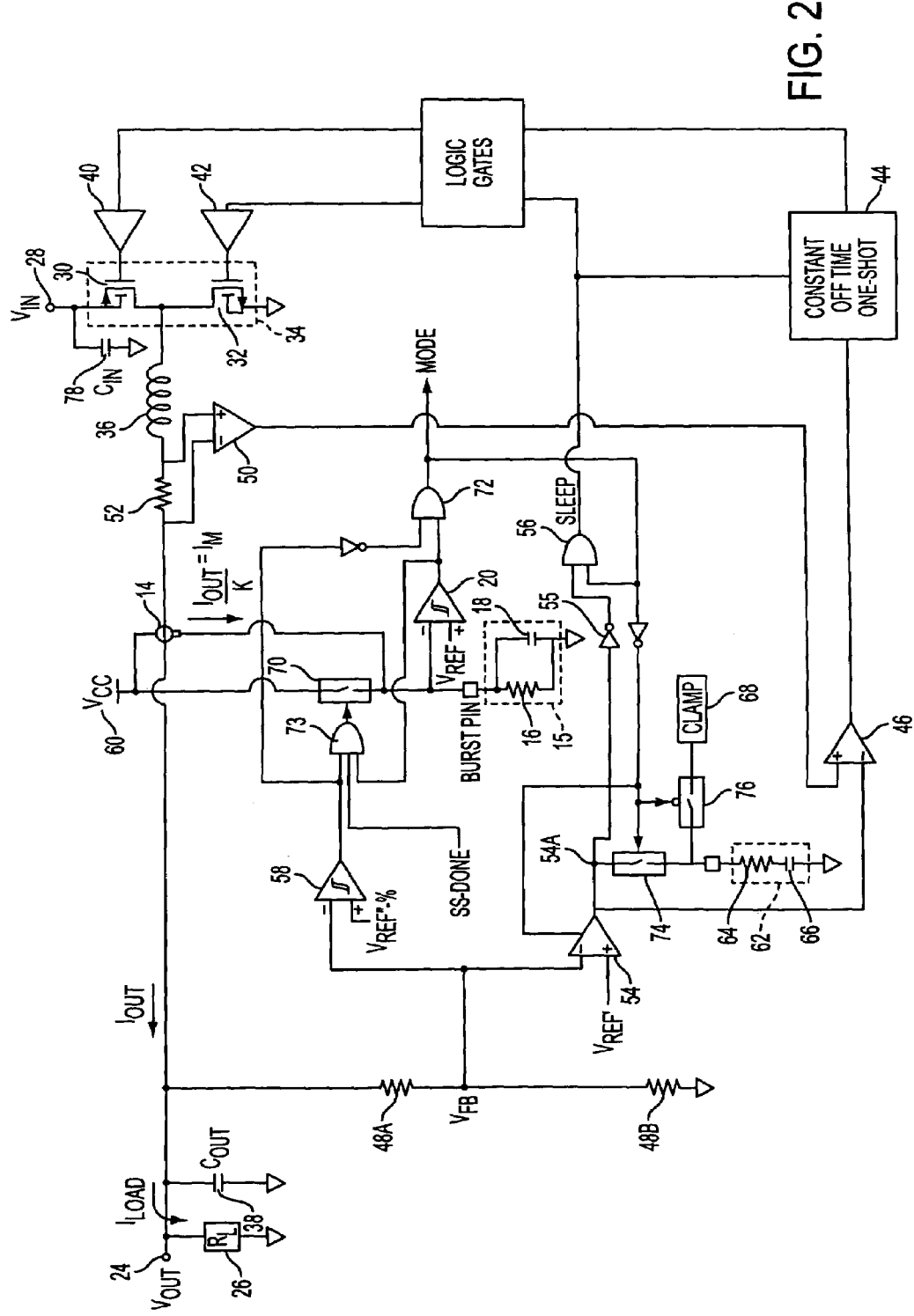
FIG. 2 is a block diagram of a synchronous step-down voltage regulator incorporating the automatic BURST control circuit of FIG. 1A, a feedback amplifier, and features for improved transient response.

FIG. 2 illustrates the automatic BURST mode control circuit of FIG. 1A integrated with a synchronous step-down power converter using current-mode control, including a feedback error amplifier and features for improved transient response. The voltage regulator of FIG. 2A may be used to provide a regulated DC output voltage $V_{OUT}$ at terminal 24 for driving load 26, which, e.g., may be a portable laptop computer or other battery-operated system. The voltage regulator operates from a supply voltage $V_{IN}$, e.g., a battery, coupled to terminal 28. When hysteretic BURST comparator 20 determines that the voltage at the BURST pin ($V_{BURST}$), which is indicative of the average output current and the load current demand, is greater than a mode transition threshold programmed by programming resistor 16 and offset by the hysteresis of BURST comparator 20, the BURST comparator outputs a logic LOW, commanding the power converter to operate in its NORMAL mode.

When the power converter of FIG. 2 is in NORMAL operational mode, output voltage $V_{OUT}$ may be maintained approximately at a regulated level by continuously and synchronously switching active switch elements 30 and 32, e.g., MOSFETs, of push-pull switch 34 to adjust the duty cycle of the switch. Push-pull switch 34 supplies current to energy storage elements inductor 36 (L1) and output capacitor 38 ($C_{OUT}$), which together smooth the alternating supply of current so that load 26 is provided a regulated voltage.

MOSFETs 30 and 32 respectively are driven by drivers 40 and 42, which in turn are controlled by one-shot circuit 44. One-shot circuit 44 provides an OFF pulse of constant duration during which time MOSFET 30 is held OFF and MOSFET 32 is held ON, causing inductor current $I_L$ to decrease. At the termination of the OFF pulse, one-shot circuit 44 provides an ON pulse during which time MOSFET 30 is held ON and MOSFET 32 is held OFF, causing the inductor current to increase. Accordingly, one-shot circuit 44 alternately turns active switch elements 30 and 320N and OFF to provide an alternating supply of current to inductor 36 and output capacitor 38.

The duty cycle of one-shot circuit 44 is controlled by current comparator 46, which compares a feedback voltage $V_{FB}$ that is proportional to output voltage $V_{OUT}$ with a voltage representative of inductor current $I_L$. Resistor divider 48A/48B ($R_1/R_2$ respectively) divides output voltage $V_{OUT}$ to generate feedback voltage $V_{FB}$. Inductor current $I_L$ is monitored by differential amplifier 50 disposed across resistor 52, which in turn is disposed in series with inductor 36.

In NORMAL mode, the voltage regulator of FIG. 2 controls inductor current $I_L$ so that feedback voltage $V_{FB}$ is regulated to be substantially equal to a reference voltage, which in turn regulates output voltage $V_{OUT}$. More specifically, error amplifier 54 is used to compare feedback voltage $V_{FB}$ to a reference voltage $V_{REF}'$. When one-shot circuit 44 provides an ON pulse, MOSFET 30 is turned ON and inductor current $I_L$ ramps up at a rate dependent on $V_{IN} - V_{OUT}$. When $I_L$ ramps up to a threshold level set by output 54A of error amplifier 54, comparator 46 trips and triggers one-shot circuit 44 to provide an OFF pulse of constant duration, during which MOSFET 30 is turned OFF and MOSFET 32 is turned ON. This in turn causes inductor current $I_L$ to ramp down at a rate dependent on $V_{OUT}$. Once the OFF pulse provided by one-shot circuit 44 times out, MOSFET 30 turns ON and MOSFET 32 turns OFF, again causing inductor current IL to ramp up and the cycle to repeat.

Accordingly, the power converter of FIG. 2 comprises a first control circuit that continuously adjusts current flowing through inductor 36 in a NORMAL operational mode. In the embodiment of FIG. 2, the first control circuit illustratively comprises error amplifier 54, comparator 46, one-shot 44, resistor 52 and differential amplifier 50. Of course, one of ordinary skill in the art would appreciate that other control circuits also may be employed based on design choice.

In accordance with the present invention, when hysteretic BURST comparator 20 determines that the average output current, and thus the load current demand, has decreased below the current level that corresponds to the mode transition threshold set by programming resistor 16 and offset by the hysteresis of BURST comparator 20, the BURST comparator outputs a logic HIGH, and the power converter transitions into BURST mode. While in BURST mode, feedback error amplifier 54 operates as a SLEEP comparator to transition the voltage converter into and out of SLEEP mode responsive to output voltage $V_{OUT}$. When SLEEP comparator 54 determines that output voltage $V_{OUT}$ is greater than a SLEEP threshold, e.g., 1% greater than the desired regulated voltage level, comparator 54 outputs a logic LOW.

That signal is inverted by inverter 55 and combined with the logic HIGH signal output by BURST comparator 20 to cause AND gate 56 to command transition of the voltage regulator into SLEEP mode, during which the switching transistors of the power converter are kept OFF. To further reduce power consumption during SLEEP and/or BURST mode, and thereby increase efficiency, the regulator circuit can be but need not be configured to turn OFF other circuit components which are not needed while the regulator is in SLEEP and/or BURST mode. During SLEEP mode, energy stored in output capacitor 38 maintains output voltage $V_{OUT}$ substantially at the regulated voltage and supports load current demand.

When SLEEP comparator 54 determines that output voltage $V_{OUT}$ is less than a WAKE threshold, e.g., 1% less than the desired regulated voltage level, comparator 54 trips and outputs a logic HIGH signal that wakes up the converter to start a new BURST cycle and recharge output capacitor 38 in BURST mode until SLEEP comparator 54 again outputs logic LOW. To recharge output capacitor 38, the power converter may be configured to alternately turning switch transistors 30 and 320N and OFF so as to vary the duty cycle. Alternatively, the power converter may be configured to maintain P-MOSFET 30 ON and maintain N-MOSFET 32 OFF When SLEEP comparator 54 again determines that output voltage $V_{OUT}$ is greater than the SLEEP threshold, SLEEP comparator 54 outputs a logic LOW that puts the circuit back in SLEEP mode. The rate at which the regulator "wakes up" to recharge output capacitor $C_{OUT}$ automatically adapts to the load current demand. The above-described procedure of waking up the converter and returning the power converter to sleep after recharging the capacitor is repeated as long as the load current demand is below the current threshold that corresponds to the user-programmable mode transition threshold.

When hysteretic BURST comparator 20 determines that the voltage at the BURST pin ($V_{BURST}$), which is indicative of the average output current and the load current demand, is greater than the user-programmable mode transition threshold, BURST comparator 20 outputs a logic LOW, which transitions the voltage regulator out of BURST mode into NORMAL operation. Since the BURST mode signal feeding into AND gate 56 now is at a logic LOW, AND gate 56 may no longer command the converter to enter SLEEP mode regardless of the output of SLEEP comparator 54, which now reverts to function as an error amplifier.

Accordingly, the power converter of FIG. 2 comprises a second control circuit that transitions the power converter from a NORMAL operational mode into a low power consumption mode, e.g., BURST or SLEEP. In the embodiment of FIG. 2, the second control circuit illustratively comprises current mirror 14 and hysteretic comparator 20, which accepts a signal generated by filter 15 that provides an indication of the average output current. If the low power consumption mode is a BURST mode, the second control circuit additionally may comprise, for example, SLEEP comparator 54, which also is employed in the NORMAL mode as error amplifier 54, inverter 55 and AND gate 56 to command the active switching elements to be maintained OFF during at least part of the low power consumption mode.

Advantageously, the mode transition point of the voltage regulator of the present invention is not subject to considerable variation, and therefore is repeatable. This is due to the fact that the automatic burst mode control circuit of the present invention is responsive to the average output current directly and not the output voltage, which (in a current mode control circuit) could cause the mode transition point to vary as much as 10:1 as a function of input and output voltage, inductance, switching frequency and noise. Furthermore, since the burst mode control circuit of the present invention directly monitors output current and averages the monitored output current to generate a signal indicative of the average thereof, the present burst mode control circuit responds quickly and accurately to changes in load current demand even during transient conditions.

It will be apparent to one of ordinary skill in the relevant art that one-shot constant OFF-time circuit 44 may be replaced with a pulse-width modulator circuit either of the type well-known in the art or otherwise, the pulse-width modulator circuit providing a pulse-width modulated signal in response to a control signal. Alternatively, one-shot constant OFF-time circuit 44 also may be replaced with a one-shot constant ON-time circuit or a variable OFF-time circuit that provides a variable OFF-time control signal dependent on, e.g., output voltage $V_{OUT}$ and input voltage $V_{IN}$. U.S. Pat. Ser. No. 5,481,178 to Wilcox et al. describes one example of such a variable OFF-time circuit that may be used to reduce the generation and emission of audible noise from inductor 36 at low input voltages. Alternatively, the voltage regulator of FIG. 2 also may be configured to turn MOSFET 30 ON and MOSFET 32 OFF when the signal from differential amplifier 50 is less than a first threshold set relative to the output signal from error amplifier 54, and turn MOSFET 30 OFF and MOSFET 320N when the signal from differential amplifier 50 is greater than a second threshold (lower than the first threshold) also set relative to the output signal from error amplifier 54. A comparator with hysteresis could be used for this purpose.

FIG. 2 also incorporates additional optional features for improved transient response. For example, to provide faster response to a sudden increase in load current demand that reduces output voltage $V_{OUT}$ below an under-voltage mode transition threshold, e.g., 3–4% below the desired regulated output voltage, when the voltage regulator is operating in low power consumption mode, e.g., BURST mode, under-voltage comparator 58 trips and commands an immediate transition from BURST mode to NORMAL operating mode in a manner described in greater detail below. To prevent premature transition back to BURST mode, e.g., due to a slight overshoot in output voltage $V_{OUT}$, voltage source 60 quickly recharges filtering capacitor 18 back to a voltage that is greater than the mode transition threshold set by programming resistor 16. Advantageously, rather than wait for mirrored current $I_M$ to recharge filtering capacitor 18 above the mode transition threshold, this provides a faster response to a sudden increase in load current demand. When output voltage $V_{OUT}$ is recharged back to regulation level under NORMAL operating mode, under-voltage comparator 58 may revert to a logic LOW. Until the average output current again reduces to a current level less than the threshold programmed by programming resistor 16, the converter remains in NORMAL operating mode. Voltage source 60 may be coupled to input voltage $V_{IN}$ and/or output voltage $V_{OUT}$. In one embodiment, voltage source 60 may charge filtering capacitor 18 to the maximum of input voltage $V_{IN}$ and output voltage $V_{OUT}$.

Similarly, if the load current demand exceeds the output current supplied by the power converter during the forced BURST mode operation described above with respect to FIG. 1B, causing output voltage $V_{OUT}$ to reduce below the under-voltage mode transition threshold, e.g., 3–4% below the desired output voltage, under-voltage comparator 58 trips and commands an immediate transition from BURST mode to NORMAL operating mode. Once output voltage $V_{OUT}$ again is in regulation, the voltage regulator will return to BURST mode and the cycle will repeat, resulting in about 3–4% output ripple. Output ripple may be reduced by coupling a small feedforward capacitor across resistor 48A.

In alternative embodiments, AND gate 73 may accept additional inputs and thereby require additional conditions to be satisfied before switch 70 is activated to couple voltage source 60 to filtering capacitor 18. For example, as shown in FIG. 2, AND gate 73 also may accept a signal from a soft-start circuit (not shown), requiring that the soft-start time be completed before switch 70 is closed.

To provide frequency compensation when the converter transitions from BURST mode to NORMAL operation, the converter also may incorporate compensation network 62 having, e.g., compensation resistor 64 in series with compensation capacitor 66. In BURST mode, SLEEP comparator 54 is disconnected from compensation network 62. This improves the converter's response when returning to NORMAL operation by preventing compensation capacitor 66 from discharging during BURST mode. In applications in which the converter may operate in BURST mode for extended periods, compensation network 62 may be clamped by clamp 68 in BURST mode, again preventing compensation capacitor 66 from discharging.

In operation, when the load current demand is high, hysteretic BURST comparator 20 outputs a logic LOW that commands the converter circuit to operate in a NORMAL mode and switch 70 to disconnect voltage source 60 from charging filtering capacitor 18. The converter then regulates the output voltage and current so that inductor current $I_L$ is regulated at a level required to support the load. When load current demand decreases, however, the duty cycle of switch 34 also decreases responsive thereto. The resulting reduction in the average output current delivered to output capacitor 38 to support the load is reflected in voltage $V_{BURST}$ at the BURST PIN. Once $V_{BURST}$ has decreased to a voltage level below the first user-programmable mode transition threshold, hysteretic BURST comparator 20 outputs a logic HIGH, which is fed to AND gate 72 along with the inverted output of under-voltage comparator 58. Thereafter, the converter circuit is commanded to operate in BURST mode.

The logic HIGH output of BURST comparator 20 also is fed to AND gate 73 along with the logic LOW output of under-voltage comparator 58 to maintain disablement of switch 70, and thereby maintain an open connection between voltage source 60 and filtering capacitor 18. As discussed above, under-voltage comparator 58 may revert to a logic LOW when output voltage $V_{OUT}$ is recharged back to the regulated level in NORMAL operating mode.

In BURST mode, AND gate 72 outputs a logic HIGH signal that opens switch 74 to disconnect compensation network 62 from the remainder of the regulator circuit, and closes switch 76 to connect clamp 68 to compensation network 62 and thereby prevent compensation capacitor 66 from discharging. The logic HIGH signal from AND gate 72 also is fed to AND gate 56, which now may command the regulator circuit to transition into SLEEP mode responsive to output signal 54A of SLEEP comparator 54. As described hereinabove, when the converter circuit is in BURST mode and output voltage $V_{OUT}$ is greater than the SLEEP threshold, e.g., 1% above the desired output voltage, SLEEP comparator 54 outputs a logic LOW that commands the converter circuit to operate in SLEEP mode. However, when the converter circuit is in BURST mode and output voltage $V_{OUT}$ decreases to be less than a WAKE threshold, e.g., 1% less than the desired output voltage, SLEEP comparator 54 outputs a logic HIGH that wakes up the converter to recharge output capacitor 38 until SLEEP comparator 54 again outputs a logic LOW.

When load current demand suddenly increases, output capacitor 38 may be unable to sustain output voltage $V_{OUT}$ approximately at the regulated level. If output capacitor 38 suddenly and quickly is discharged, output voltage $V_{OUT}$ may decrease at a rate faster than the rate at which filtering capacitor 18 is recharged by mirror current $I_M$. When output voltage $V_{OUT}$ decreases to a level less than the under-voltage mode transition threshold, e.g., 3–4% below that of the desired output voltage, under-voltage comparator 58 trips and outputs a logic HIGH. This signal then is fed to AND gate 72, which immediately transitions the converter out of BURST mode. The logic HIGH output of the under-voltage comparator also is fed to AND gate 73, which commands switch 70 to close, connecting voltage source 60 to filtering capacitor 18. Voltage source 60 then quickly charges filtering capacitor to a voltage that is greater than the second user-programmable mode transition threshold. This in turn causes the hysteretic comparator to output a logic LOW that opens switch 70, disconnecting voltage source 60 from filtering capacitor 18. Thereafter, the regulator circuit operates in NORMAL operating mode until $V_{BURST}$ once again drops below the programmed mode transition threshold, indicating that the average output current (and thus the load current demand) is low, at which time the above-described cycle repeats.

In addition to the buck topology described above, the high-efficiency BURST mode control circuit of the present invention also may be integrated with switching regulators of different topologies. For example, FIG. 3A depicts a block diagram of a multiphase boost regulator circuit. Switching regulator 80 is a synchronous, 4-phase boost converter that controls the duty cycle in the NORMAL operational mode by pulse width modulation (PWM) and, when load current demand is low, operates in BURST mode. The switching regulator operates in 4-phases, which may be equally spaced (i.e., 90° apart). Advantageously, this increases output ripple frequency by a factor of four (see FIG. 3B), reducing output capacitor ripple, and thereby reducing the output capacitance requirement. Multiphase operation also reduces input current ripple so that input current $V_{IN}$ experiences less noise. To facilitate description of switching regulator 80, the four phases hereinafter will be referred to as Phase A, Phase B, Phase C and Phase D. Of course, it will be obvious to one of ordinary skill in the art that power converter 80 may be configured to operate in more or less phases.

Each phase of switching regulator 80 respectively is associated with one of four power blocks 81, delineated by dashed lines in FIG. 3A. Each power block 81 may include electrical components that control pulse width modulation, slope compensation, and zero current detection. Each power block 81 interacts with the remainder of the regulator, accepting signals that indicate or control, e.g., NORMAL or BURST mode, SLEEP mode, duty cycle, current limit, start-up and soft-start. Each power block also provides output current to output pins 82, which correspond to each phase. The output pins are in turn coupled to output capacitor 84 and load 86.

Switching regulator 80 is powered by a voltage source, e.g., a battery, coupled to input terminal 88. Each power block 81 is coupled to its respective input pin 90, which in turn is externally coupled to its respective inductor 92, input terminal 88 and common input capacitor 93. To disable any of the phases, the inductor corresponding to that phase may be eliminated. This permits a user to reduce cost and board area in applications that do not require the full power capability of voltage regulator 80, or where peak efficiency may not be as important as cost and size.

When the power converter of FIG. 3A is in NORMAL operational mode, output voltage $V_{OUT}$ may be maintained at a regulated level by continuously and synchronously switching active switch elements 94 and 96, a pair of which optionally may be disposed within each power block 81 along with anti-cross conduction circuitry. The switching frequency of each pair of active switch elements, e.g., MOSFETs, are established by oscillator 98 and 4-phase divider/generator 100. Oscillator 98 provides an operational frequency, which may be set via a user programmable resistor 102 coupled between $R_T$ pin 104 and ground. An internally trimmed timing capacitor is provided within the integrated circuit. Divider/generator 100 then divides the oscillator frequency by four to generate the four phases, each phase shifted by 90°.

Oscillator 98 may be synchronized with an external clock applied to SYNCIN pin 106, and configured to provide an output synchronization pulse that is 180° out of phase from the frequency provided to divider/generator 100 to facilitate synchronization of two voltage regulators. For example, the output synchronization pulse of a first voltage regulator 80 may be provided to SYNCIN pin 106 of a second voltage regulator 80 to create an 8-phase converter, in which the BURST mode control circuits of the voltage regulators may be disabled for some applications by pulling up on the BURST pin. For example, if a user expects the load current demand to dwell approximately at the current level that corresponds to the user-programmable mode transition threshold for a prolonged period of time, then a user may consider disabling the BURST mode control circuits of the voltage regulators.

The fixed frequency pulses generated by oscillator 98 and 4-phase generator 100 then may be provided to pulse width modulator 108 of each power block 81, the duty cycle of which may be current mode controlled. In one embodiment, a feedback voltage indicative of output voltage $V_{OUT}$ is fed into error amplifier 110, e.g., a transconductance amplifier.

Error amplifier 110 compares the feedback voltage to a reference voltage and outputs error signal $V_e$. Comparator 112 then compares error voltage $V_e$ and optionally a signal indicative of a user-programmable maximum current limit level to a signal indicative of the peak current, which optionally may be slope-compensated. The peak current signal may be obtained from current mirror 114, which is configured to mirror a fraction of the current flowing through N-MOSFET 96 with little or no current loss. The maximum current limit level may be user-programmed by coupling current limit resistor 116 between ground and over-current protection circuit 118, examples of which are well-known to one of ordinary skill in the art. PWM 108 then controls the duty cycle of voltage regulator 80 responsive to the output of comparator 112, turning each pair of P-MOSFET 94 and N-MOSFET 960N and OFF as appropriate to adjust inductor current $I_L$ and thereby regulate output voltage $V_{OUT}$.

Accordingly, the power converter of FIG. 3A comprises a first control circuit that continuously adjusts current flowing through inductor(s) 92 in a NORMAL operational mode. In the embodiment of FIG. 3A, the first control circuit illustratively may comprise error amplifier 110, comparator 112, PWM 108, and current mirror 114. Of course, one of ordinary skill in the art would appreciate that other control circuits also may be employed based on design choice.

In accordance with the present invention, switching regulator 80 also includes a BURST mode control circuit to automatically transition regulator 80 into and out of BURST mode. As discussed hereinabove with respect to FIGS. 1 and 2, current mirror 118 monitors a fraction of output current $I_{OUT}$ with little or no current loss. Mirrored current $I_M$ is fed to user-programmable filter 119 having programming resistor 120 ($R_{BURST}$) and filtering capacitor 122, the capacitance of which is selected to filter the pulses of mirrored current $I_m$ and reduce the ripple of the voltage ($V_{BURST}$) that is generated across resistor 120 and capacitor 122. The generated BURST voltage ($V_{BURST}$) is indicative of average output current $I_{OUT,AVG}$ and is used to automatically transition the power converter into and out of BURST mode.

In particular, like the BURST mode control circuit of FIGS. 1 and 2, burst voltage $V_{BURST}$ is fed into hysteretic comparator 124 and compared to a reference voltage. When $V_{BURST}$ falls below a first user-programmable mode transition threshold, indicating a light load current demand, hysteretic comparator 124 outputs a signal HIGH that commands converter 80 to operate in BURST mode. When $V_{BURST}$ increases beyond a second higher user-programmable mode transition threshold, indicating a heavy load current demand, hysteretic comparator 124 commands NORMAL operation of the converter. A user may program converter control circuit 80 to transition into and out of BURST mode at particular average output currents by selecting the resistance of programming resistor 120, as described hereinabove.

As with the converter described with respect to FIG. 2, error amplifier 110 operates as a SLEEP comparator in BURST mode to transition the voltage converter into and out of SLEEP mode responsive to output voltage $V_{OUT}$. When SLEEP comparator 110 determines that output voltage $V_{OUT}$ is greater than a SLEEP threshold, e.g., 1% greater than the desired regulated voltage level, voltage $V_e$ at the output of comparator 110 is input into AND gate 125 which then commands transition of the voltage regulator into SLEEP mode if the voltage regulator is in BURST mode. During SLEEP mode, switching transistors 94 and 96 of the power converter are kept OFF. Additional components of the voltage regulator that are not needed during SLEEP mode also may be but need not be turned OFF during SLEEP mode to increase regulator efficiency. When SLEEP comparator 110 determines that output voltage $V_{OUT}$ is less than a WAKE threshold, e.g., 1% less than the desired regulated voltage level, comparator 110 trips and wakes up the converter to start a new BURST cycle and recharge output capacitor 84.

In an optional embodiment, after the SLEEP comparator commands transition out of SLEEP mode, voltage regulator 80 may be configured to delay the transition by a predetermined finite amount of time, e.g., 5 us, to permit bias currents to charge the components of the voltage regulator that were turned OFF during SLEEP mode up to a known operational state, i.e., become "smart." After the end of the delay period, MOSFETS 94 and 96 may be enabled for switching.

To recharge output capacitor 84 during BURST mode, voltage regulator 80 is configured to shut down oscillator 98, and alternately turn MOSFETs ON and OFF so that (1) the ON time of P-MOSFET 94 and the OFF time of N-MOSFET 96 are determined by the time it takes inductor current $I_L$ to reach a peak current limit that is internally fixed independently of current-limit programming resistor 116; and (2) the OFF time of P-MOSFET 94 and the ON time of N-MOSFET 96 are determined by the time it takes inductor current $I_L$ to return to zero. Zero-current detection comparator 140 is used to perceive zero inductor current $I_L$. When SLEEP comparator 110 again determines that output voltage $V_{OUT}$ is greater than the SLEEP threshold, the SLEEP comparator outputs a logic LOW, returning the power converter to SLEEP mode. Alternatively, voltage converter 80 may be configured to recharge output capacitor 84 by fixed frequency pulse width modulation or by maintaining P-MOSFET 940N and N-MOSFET 96 OFF during the entire wake-up period.

When hysteretic BURST comparator 124 determines that the average output current, and thus the load current demand, is greater than the mode transition level programmed by programming resistor 120, BURST comparator 124 transitions voltage regulator 80 out of BURST mode into NORMAL operation. Like the converter circuits of FIG. 2, AND gate 125 prevents voltage regulator 80 from entering SLEEP mode during NORMAL operation.

Accordingly, the power converter of FIG. 3A comprises a second control circuit that transitions the power converter from a NORMAL operational mode into a low power consumption mode, e.g., BURST or SLEEP. In the embodiment of FIG. 3A, the second control circuit illustratively may comprise current mirror 118 and hysteretic comparator 124, which accepts a signal generated by filter 119 that is indicative of the average output current. If the low power consumption mode is a BURST mode, the second control circuit additionally may comprise, for example, SLEEP comparator 110, which also is employed in the NORMAL mode as error amplifier 110, and AND gate 125 to command the active switching elements to be maintained OFF during at least part of the low power consumption mode.

Figure 3C:
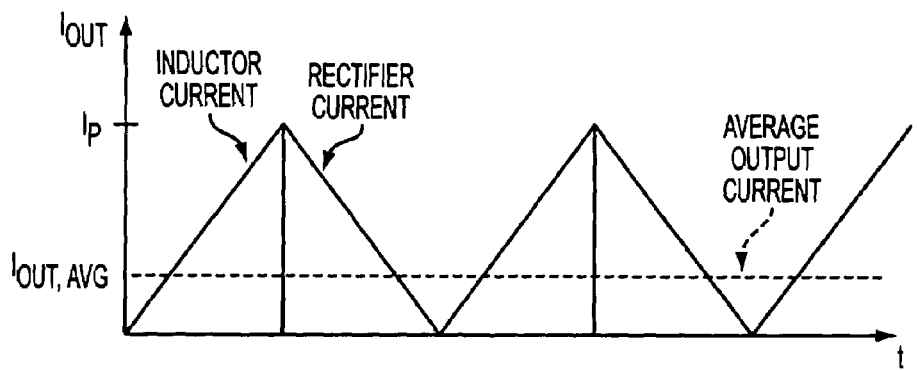
FIGS. 3C–E show illustrative current and voltage waveforms of the voltage regulator of FIG. 3A.
Figure 3D:
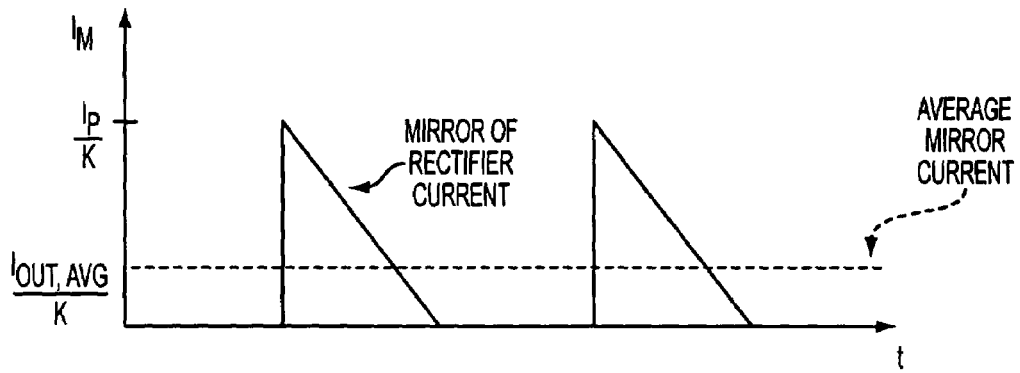
Figure 3E:
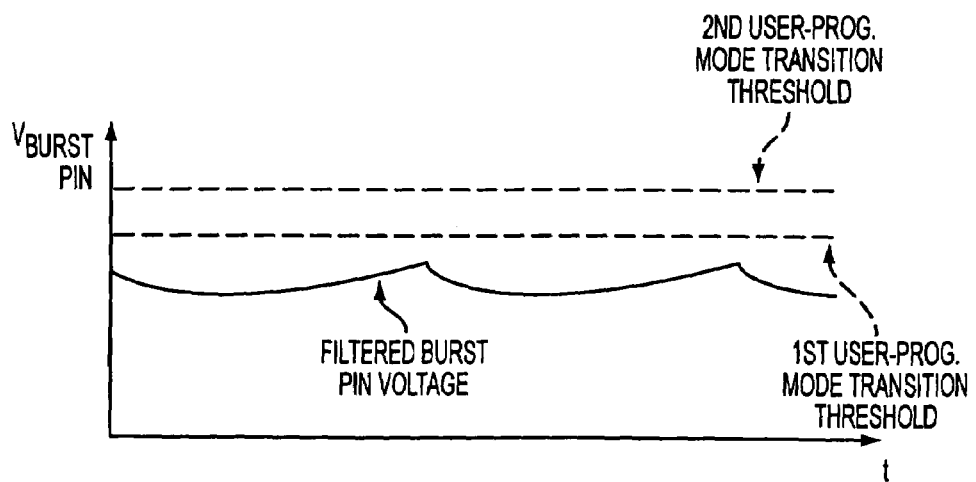

FIGS. 3C–3E show illustrative current and voltage waveforms of the voltage regulator of FIG. 3A when the voltage regulator is recharging output capacitor 84 during BURST mode. FIG. 3C depicts the pulsed inductor and rectifier current waveform at light load, which is maximum at peak current $I_p$; while FIG. 3D illustrates mirrored rectifier current $I_M$, in which the pulsed rectifier waveform is reduced by mirror ratio K. FIG. 3E shows the filtered voltage at the BURST PIN when the voltage regulator is operating in BURST mode.

Also as discussed in greater detail with respect to FIG. 2, voltage regulator 80 may include features for improved transient response. More specifically, voltage regulator 80 may include compensation network 128 (e.g., compensation capacitor 130) that may be disconnected from SLEEP comparator 110 during BURST mode to prevent compensation capacitor 130 from discharging to zero, thereby improving the converter's response when returning to NORMAL operation. When the voltage regulator transitions from BURST mode to NORMAL mode, compensation network 128 is recoupled to SLEEP comparator 110. In applications in which the converter may operate in BURST mode for extended periods, compensation network 128 may be clamped in BURST mode, again preventing compensation capacitor 130 from discharging.

To provide faster response to sudden increases in load current demand when the voltage regulator is operating in automatic or forced BURST mode, under-voltage comparator 132 outputs a signal to logic gates 126 that commands an immediate transition from BURST mode to NORMAL operating mode when output voltage $V_{OUT}$ decreases below an under-voltage mode transition threshold, e.g., 3–4% below regulation level. To prevent premature transition back to BURST mode, e.g., due to a slight overshoot, in output voltage $V_{OUT}$, voltage regulator 80 may include internal pull-up circuit 134 that quickly recharges filtering capacitor 122 above the programmed mode transition threshold in a manner similar to that described with respect to FIG. 2 hereinabove. Advantageously, rather than waiting for mirrored current $I_M$ to recharge filtering capacitor 122 above the mode transition threshold, this provides a faster response to a sudden increase in load current demand. When output voltage $V_{OUT}$ is recharged back to regulation level under NORMAL operating mode, under-voltage comparator 132 reverts to a logic LOW.

Figure 4A:
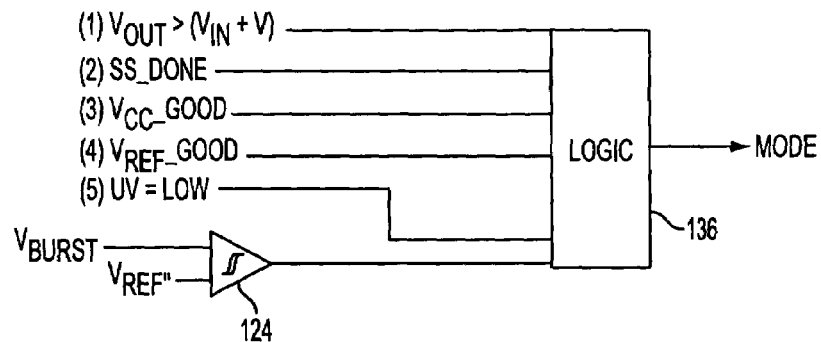
FIGS. 4A–4C are partial block diagrams of alternative circuits to transition the voltage regulators of FIGS. 1, 2, and/or 3A into BURST and/or SLEEP modes.

In addition to transitioning voltage converter 80 into and out of BURST mode responsive to BURST comparator 124, voltage regulator 80 may be configured to transition between modes responsive to additional conditions. For example, as illustrated in FIG. 4A, additional conditions may include but are not limited to: (1) output voltage $V_{OUT}$ is greater than input voltage $V_{IN}$ by a predetermined voltage; (2) the soft-start time is completed; (3) supply voltage $V_{cc}$ is at an acceptable level; (4) the reference voltage is at an acceptable level; and (5) under-voltage comparator 132 of FIG. 3A is low. If one or more of these conditions are not satisfied or the BURST comparator indicates that load current demand is high, logic gates 136 prohibit transition of voltage regulator 80 into BURST mode.

Figure 4B:
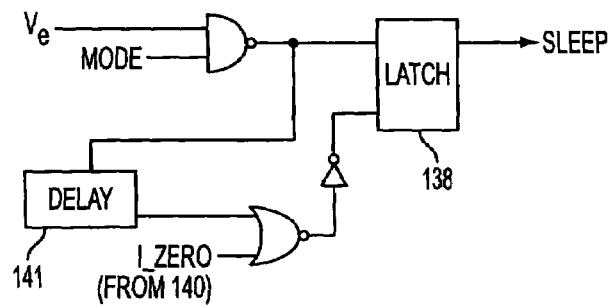

Likewise, to transition voltage regulator 80 into SLEEP mode, the regulator also may be configured to respond to additional conditions. For example, as depicted in FIG. 4B, when the voltage regulator is in BURST mode and SLEEP comparator 110 indicates that the regulator should enter SLEEP mode, latch 138 delays transition into SLEEP mode until the latch is set. Latch 138 may be set when zero-current detection comparator 140 (see FIG. 3A) perceives that the current through inductor 92 has decayed to zero. Advantageously, this permits reduction of non-synchronous body diode conduction of internal MOSFET rectifier 94, increasing efficiency over the small number of pulses in each BURST cycle. If inductor current $I_L$ does not decay to zero within a predetermined amount of time, e.g., 5 us, after the SLEEP comparator trips, latch 138 may be set by delay circuit 141.

Figure 4C:
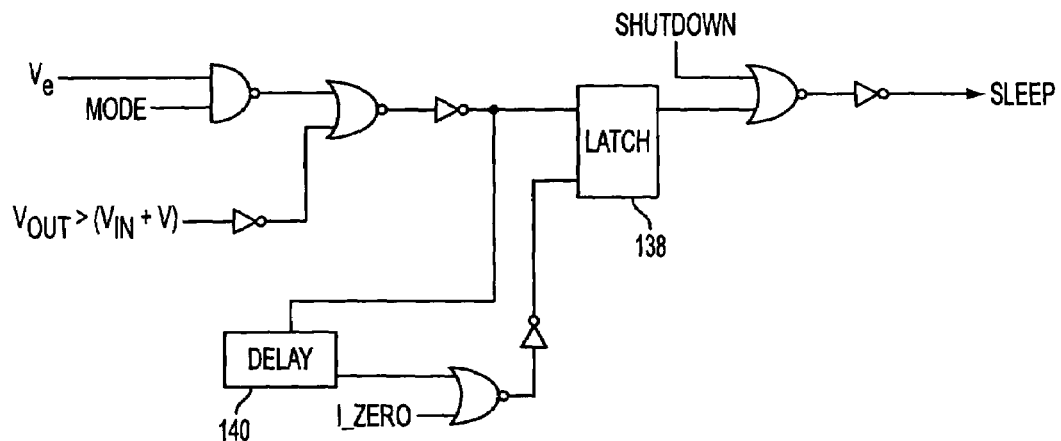

In FIG. 4C, the voltage regulator enters SLEEP mode only after the following conditions are satisfied: (1) output $V_e$ of SLEEP comparator 110 indicates that $V_{OUT}$ is greater than the SLEEP threshold; (2) the regulator is in BURST mode; (3) output voltage $V_{OUT}$ is greater than input voltage $V_{IN}$ by a predetermined voltage; (4) the voltage regulator has not been commanded to SHUTDOWN; and (5) either inductor current $I_L$ has decayed to zero or a predetermined time has elapsed since the first three criteria have been met.

Pursuant to another aspect of the present invention, voltage regulator 80 may be configured to activate only one of the four phases, e.g., Phase A, when the regulator is in BURST mode to increase regulator efficiency. FIG. 4D depicts power blocks 81A–D corresponding to Phases A–D. Each power block 81 has a multiplicity of input lines, including MODE input line 142 that accepts a signal indicating whether the voltage regulator is in BURST mode or NORMAL mode and SLEEP input line 144 that accepts a signal indicating whether the voltage regulator is in SLEEP mode. Voltage regulator 80 is configured so that, when the regulator enters BURST mode, the MODE signal is fed to MODE inputs 142A–D of power blocks 81A–D and to SLEEP inputs 144B–D of power blocks 81B–D. Accordingly, anytime BURST mode is entered, Phase A remains active while Phases B–D are put into SLEEP mode, remaining OFF while voltage regulator 80 is in BURST mode.

In an optional embodiment, when power converter 80 is commanded to transition back to NORMAL mode, power blocks 81B–D may be brought out of SLEEP mode after a delay by a predetermined finite amount of time to permit the voltage regulator to become "smart" as discussed hereinabove.

Each power block 81A–D also has a multiplicity of output lines, including I_ZERO output 146 that dispatches the output signal of zero-current detection comparator 140 (see FIG. 3A), which perceives when inductor current $I_L$ has decayed to zero. Voltage regulator 80 may be configured so that only power block 81A outputs the output signal of its zero-current detection comparator since only Phase A is active during BURST mode. I_ZERO outputs 146B–D of power blocks 81B–D may be left open since Phases B–D are inactivate during BURST mode.

Examples of modifications that may be made to switching regulator 80 include but are not limited to:
(1) operation with a single phase; (2) use of other current limit circuitry either known to those of ordinary skill in the art or otherwise; and/or (3) inclusion of a low battery indicator. Additional modifications may be employed based on design choice.

Figure 4E:
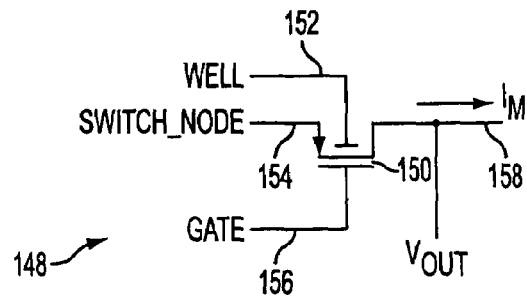
FIG. 4E is an illustrative schematic diagram of a current mirror for use with the circuit of the present invention.
Figure 4D:
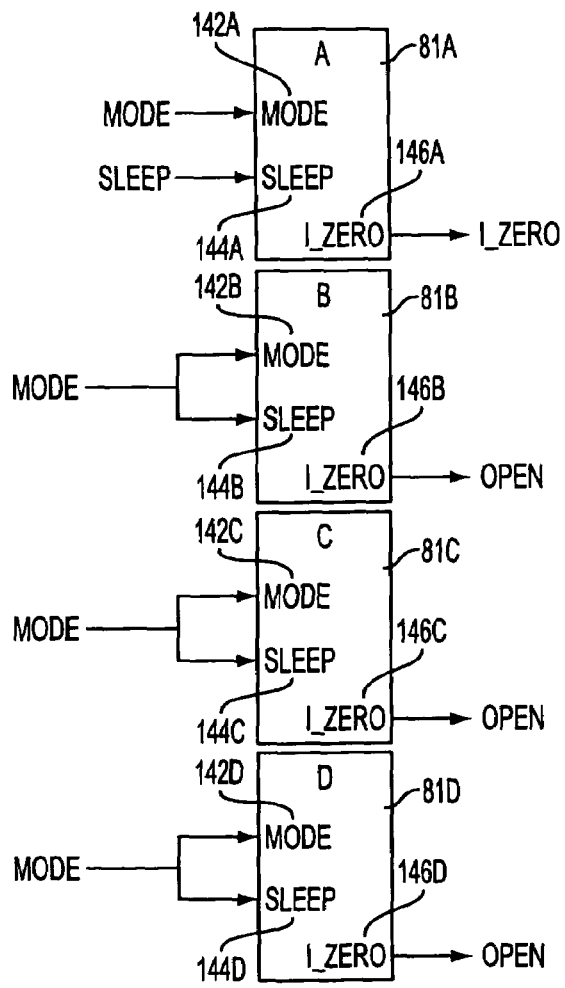
FIG. 4D is a partial block diagram showing how the voltage regulator of FIG. 3A is configured to deactivate three of four phases during BURST mode.

Referring now to FIG. 4E, an illustrative current mirror is described for use in the present invention to monitor output current $I_{OUT}$. Current mirror 148 includes power MOSFET 150, e.g., a p-type MOSFET, coupled in parallel to rectifying MOSFET 94 of the boost converter of FIG. 3A. Mirror MOSFET 150 is coupled to rectifying MOSFET 94 such that well 152, source 154 and gate 156 are respectively connected to the well, switch node, and gate of the rectifying MOSFET. To replicate the conditions under which rectifying MOSFET 94 operates, drain 158 of mirror MOSFET 150 is maintained at output voltage $V_{OUT}$. Mirror current $I_M$ is drawn from drain 158 of mirror MOSFET 150. The mirror MOSFET samples a fraction of the current flowing through the rectifying MOSFET, with little or no current loss and thus little impact on regulator efficiency.

Current mirror 148 also may comprise additional embodiments of current mirrors well-known to those of ordinary skill in the art, e.g., BJT current mirrors, cascode configuration mirrors, Wilson configuration mirrors, modified Wilson configuration mirrors, resistors, etc.

Current mirror 148 also may be employed to monitor current flowing through N-MOSFET 96 of FIG. 3A. In one embodiment, current mirror 148 may include power MOSFET 150, e.g., a n-type MOSFET, coupled in parallel to MOSFET 96. Mirror MOSFET 150 may be coupled to MOSFET 96 such that well 152, source 154 and gate 156 are respectively connected to the well, switch node, and gate of MOSFET 96. To replicate the conditions under which MOSFET 96 operates, drain 158 of mirror MOSFET 150 may be maintained at ground. Mirror current $I_M$ may be drawn from drain 158 of mirror MOSFET 150.

Figure 5:
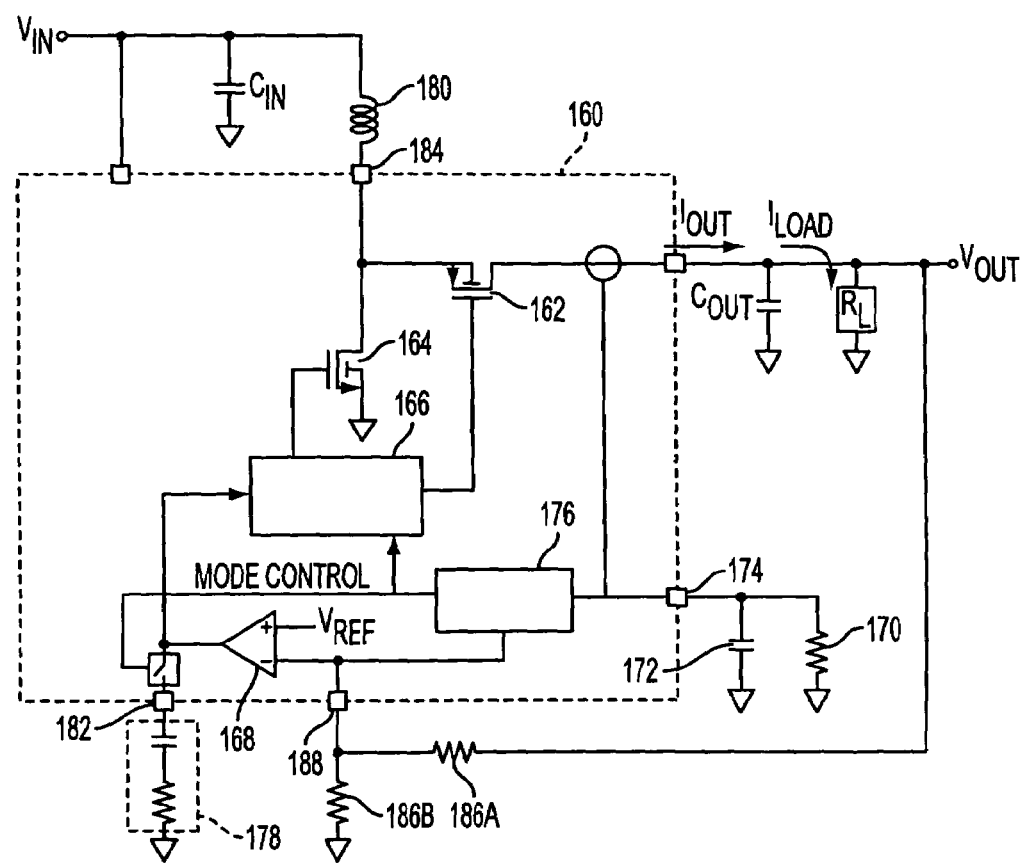
FIG. 5 is a simplified block diagram of a synchronous boost voltage regulator employing the automatic BURST mode control circuit of the present invention.

Referring now to FIG. 5, a simplified schematic diagram of a boost converter incorporating the programmable, automatic BURST control circuit of the present invention is described, in which the dashed lines represent the boundaries of an illustrative monolithic converter integrated circuit (IC). In one embodiment, IC 160 integrally may comprise P- and N-MOSFETs 162 and 164, the duty cycle of which is modulated by modulator 166 and error amplifier 168. Of course, monolithic IC 160 also may be manufactured without integral MOSFETs 162 and 164, which may be coupled to the IC via additional pins.

With the exception of programming resistor 170 and filtering capacitor 172, both of which may be selected by the user and coupled to BURST pin 174 external to IC 160, any remaining components 176 of the automatic BURST mode control circuit described with respect to FIGS. 1, 2, 3A, and 4A–4e also may be integrated within IC 160. Compensation network 178 and inductor 180 also may be coupled externally to IC 160 via COMP pin 182 and input pin 184, respectively, so that users may select the resistor, capacitor, and inductor appropriate for their particular applications.

If monolithic IC 160 is a constant output voltage regulator, voltage divider 186A/186B may be integrated within IC 160. However, if monolithic IC 160 is a programmable output voltage regulator, voltage divider 186A/186B may be coupled to monolithic IC 160 externally via FB pin 188.

As used herein, the term "monitor" and derivatives thereof refer to the action of detecting or measuring the instantaneous value of a current or voltage signal or a fraction thereof. In contrast, the term "sense" and derivatives thereof broadly refer to the action of obtaining some indication, either directly or indirectly, of a current or voltage signal. Furthermore, the term "an output voltage" does not necessarily mean that the voltage at the output of the power converter is a constant value. Rather, as is understood in the art, the power converter's output voltage may vary to some extent.

Although illustrative embodiments of the present invention are described above, it will be apparent to one skilled in the art that various changes and modifications may be made without departing from the invention. For example, while the above-described figures depict a resistive current shunt and transistor-based current mirror to monitor output current $I_{OUT}$, additional embodiments of current monitors also may be employed, such as current transformers, Hall effect devices, or optical current sensors.

In addition, while the above-described embodiments depict the use of synchronous switches, each having two active switching elements that are driven out of phase to supply current at an output voltage to a load, one of ordinary skill in the relevant art would appreciate that either of the two MOSFETs may be replaced with a passive switch element, e.g., a switching diode. The present invention also may be integrated with voltage regulators employing other types of switches having, e.g., a pair of N-MOSFETS, a pair of P-MOSFETS, or bipolar junction transistors.

It will be apparent to one of ordinary skill in the art that the switching regulators of the present invention could be taken out of SLEEP mode a predetermined time period after going into SLEEP mode, rather than transitioning out of SLEEP mode after load current demand increases as described hereinabove. All reference voltages defining the thresholds may comprise the same threshold levels or one or more different levels, and may be constant or variable in nature.

Furthermore, while the above-described embodiments incorporate current-mode regulation of the converter's duty cycle, it should be obvious to one of ordinary skill in the art that the BURST mode control circuit of the present invention also may be integrated with power converters having voltage-mode regulation. Furthermore, the BURST mode control circuit of the present invention also may be integrated with current regulators in a manner similar to that described above.

It is intended in the appended claims to cover all such changes and modifications that fall within the true spirit and scope of the invention.

What is claimed is:

1. A circuit for controlling a power converter that delivers output current to an output capacitor at an output voltage, the power converter (1) having an inductor and a switch circuit with one or more active switch elements and (2) configured to be coupled to a user-programmable filter, the circuit comprising:

a first control circuit that continuously adjusts current flowing through the inductor in a first operational mode; and a second control circuit that commands all of the one or more active switch elements to be maintained OFF during at least part of a second operational mode, the second control circuit configured to monitor the output current and transition the power converter from the first operational mode to the second operational mode after an average signal crosses a first user-programmable mode transition threshold, the second operational mode having a duration that is responsive to a decrease in load current demand, wherein the monitored output current is averaged to generate the average signal.

2. The circuit of claim 1, wherein at least one of the one or more active switch elements is turned ON during the second operational mode responsive to the output voltage falling below a WAKE threshold.

3. The circuit of claim 1, wherein the second control circuit further comprises an under-voltage comparator configured to permit transition of the power converter from the second operational mode to the first operational mode responsive to the output voltage falling below an under-voltage mode transition threshold.

4. The circuit of claim 3, wherein at least one of the one or more active switch elements is turned ON during the second operational mode responsive to the output voltage falling below a WAKE threshold that is greater than the under-voltage mode transition threshold.

5. The circuit of claim 3, wherein the second control circuit further comprises a switch that selectively couples the user-programmable filter to a power source responsive to the output voltage falling below the under-voltage mode transition threshold, thereby permitting the power source to recharge the user-programmable filter.

6. The circuit of claim 1, wherein the second operational mode spans more than one switch circuit cycle.

7. The circuit of claim 1, wherein the second control circuit is configured to transition the power converter from the second operational mode to the first operational mode after the average signal crosses a second user-programmable mode transition threshold.

8. The circuit of claim 7, wherein the second user-programmable mode transition threshold is greater than the first user-programmable mode transition threshold.

9. The circuit of claim 1, wherein the first user-programmable mode transition threshold is programmed by a programming resistance.

10. The circuit of claim 1, wherein the second control circuit comprises a transistor configured to monitor a fraction of the output current.

11. The circuit of claim 1, further comprising a compensation network having at least a compensation capacitor.

12. The circuit of claim 11, further comprising a switch configured to decouple the compensation network from the first and second control circuits when the power converter is in the second operational mode and to couple the compensation network to the first and second control circuits when the power converter is in the first operational mode.

13. The circuit of claim 11, further comprising a clamp configured to clamp a voltage on the compensation capacitor when the power converter is in the second operational mode.

14. The circuit of claim 1, wherein a duty cycle of the switch circuit is voltage-mode controlled.

15. The circuit of claim 1, wherein a duty cycle of the switch circuit is current-mode controlled.

16. The circuit of claim 1, wherein the first operational mode is configured for 4-phase operation.

17. The circuit of claim 16, wherein three of the four phases are configured to be reversibly deactivated during the second operational mode.

18. The circuit of claim 1, wherein the second control circuit is configured to permit a user to force the power converter to operate in the first operational mode or the second operational mode.

19. A circuit for controlling a power converter that delivers output current to an output capacitor at an output voltage, the power converter (1) having an inductor and a switch circuit with one or more active switch elements and (2) configured to be coupled to a user-programmable filter, the circuit comprising:
a first control circuit that continuously adjusts current flowing through the inductor in a first operational mode; and
a second control circuit that monitors the output current and transitions the power converter from the first operational mode into a low power consumption mode after an average signal crosses a first user-programmable mode transition threshold, the low power consumption mode having a duration that is responsive to a decrease in load current demand, wherein the monitored output current is averaged to generate the average signal.

20. A circuit for controlling a power converter that delivers output current to an output capacitor at an output voltage, the circuit comprising:
a current mirror that monitors the output current; and
a comparator that commands transition of the power converter into a low power consumption mode after an average signal crosses a first user-programmable mode transition threshold, the low power consumption mode having a duration that is responsive to a decrease in load current demand, wherein the monitored output current is averaged to generate the average signal.

21. A power converter that delivers output current to an output capacitor at an output voltage, the power converter having an inductor and a switch circuit with one or more active switch elements and a first control circuit that continuously adjusts current flowing through the inductor in a first operational mode, the power converter comprising:
a second control circuit that monitors the output current and transitions the power converter from the first operational mode into a low power consumption mode after an average signal crosses a first user-programmable mode transition threshold, the low power consumption mode having a duration that is responsive to a decrease in load current demand; and
a filter that averages the monitored output current to generate the average signal.

22. A method for controlling a power converter (1) having an inductor and a switch circuit with one or more active switch elements and (2) configured to be coupled to a user-programmable filter, the power converter configured to deliver output current to an output capacitor at an output voltage, the method comprising:
monitoring the output current;
averaging the monitored output current to generate an average signal;
continuously adjusting current flowing through the inductor in a first operational mode;
transitioning the power converter from the first operational mode to a second operational mode after the average signal crosses a first user-programmable mode transition threshold;
maintaining all of the one or more active switch elements OFF during at least part of the second operational mode; and
maintaining the power converter in the second operational mode for a duration that is responsive to a decrease in load current demand.

23. The method of claim 22, further comprising turning at least one of the one or more active switch elements ON during the second operational mode responsive to the output voltage falling below a WAKE threshold.

24. The method of claim 22, further comprising transitioning the power converter from the second operational mode to the first operational mode responsive to the output voltage falling below an under-voltage mode transition threshold.

25. The method of claim 24, further comprising turning at least one of the one or more active switch elements ON during the second operational mode responsive to the output voltage falling below a WAKE threshold that is greater than the under-voltage mode transition threshold.

26. The method of claim 24, further comprising:
selectively coupling the user-programmable filter to a power source responsive to the output voltage falling below the under-voltage mode transition threshold; and
recharging the user-programmable filter.

27. The method of claim 22, further comprising transitioning the power converter from the second operational mode to the first operational mode responsive to the average signal crossing a second user-programmable mode transition threshold.

28. The method of claim 27, wherein the second user-programmable mode transition threshold is greater than the first user-programmable mode transition threshold.

29. The method of claim 22, further comprising programming the first user-programmable mode transition threshold with a programming resistance.

30. The method of claim 22, wherein monitoring the output current comprises monitoring a fraction of the output current through a transistor.

31. The method of claim 22, further comprising providing frequency compensation with a compensation network having at least a compensation capacitor.

32. The method of claim 31, further comprising reducing discharge of the compensation capacitor when the power converter is in the second operational mode.

33. The method of claim 22, further comprising controlling a duty cycle of the switch circuit with voltage-mode control.

34. The method of claim 22, further comprising controlling a duty cycle of the switch circuit with current-mode control.

35. The method of claim 22, wherein the first operational mode is configured for 4-phase operation, the method further comprising reversibly deactivating three of the four phases during the second operational mode.

36. A method for controlling a power converter coupled to an inductor and a switch circuit having one or more active switch elements, the power converter configured to deliver output current to an output capacitor at an output voltage, the method comprising:

monitoring the output current;

averaging the monitored output current to generate an average signal;

continuously adjusting current flowing through the inductor in a first operational mode;

transitioning the power converter from the first operational mode to a low power consumption mode after the average signal crosses a first user-programmable mode transition threshold; and maintaining the power converter in the low power consumption mode for a duration that is responsive to a decrease in load current demand.

\* \* \* \* \*